United States Patent
Kahrobaei et al.

(10) Patent No.: US 9,942,031 B2
(45) Date of Patent: Apr. 10, 2018

(54) SYSTEM AND METHOD FOR PRIVATE-KEY FULLY HOMOMORPHIC ENCRYPTION AND PRIVATE SEARCH BETWEEN RINGS

(71) Applicant: Research Foundation of the City University of New York, New York, NY (US)

(72) Inventors: Delaram Kahrobaei, Brooklyn, NY (US); Ha T. Lam, Forest Hills, NY (US); Vladimir Shpilrain, New York, NY (US)

(73) Assignee: Research Foundation of the City University of New York, New York, NY (US)

( * ) Notice: Subject to any disclaimer, the term of this patent is extended or adjusted under 35 U.S.C. 154(b) by 108 days.

(21) Appl. No.: 14/835,019

(22) Filed: Aug. 25, 2015

(65) Prior Publication Data

US 2017/0063526 A1 Mar. 2, 2017

Related U.S. Application Data

(60) Provisional application No. 62/045,200, filed on Sep. 3, 2014.

(51) Int. Cl.
*H04K 1/00* (2006.01)
*H04L 9/00* (2006.01)
*H04L 9/28* (2006.01)

(52) U.S. Cl.
CPC .................. *H04L 9/008* (2013.01)

(58) Field of Classification Search
CPC ........................................................ H04L 9/008
(Continued)

(56) References Cited

U.S. PATENT DOCUMENTS 8,199,911 B1 * 6/2012 Tsaur ................... G06F 21/6209
380/278
9,369,273 B2 * 6/2016 Rohloff ................... H04L 9/008
(Continued)

OTHER PUBLICATIONS

Gentry, Craig, "Fully Homomorphic Encryption Using Ideal Lattices", STOC, '09, Proceedings of the 41st Annual ACM Symposium on Theory of Computing, pp. 169-178, ACM, New York, NY 2009.

(Continued)

*Primary Examiner* — Dant B Shaifer Harriman
(74) *Attorney, Agent, or Firm* — Hoffmann & Baron, LLP

(57) ABSTRACT

A system for producing a public ring that is fully homomorphically encrypted. The system comprises a processor which generates a first presentation G of a ring, where G= $\langle x,y | x^2=0, y^2=0, xy+(p+1)yx=1 \rangle$, where x and y are generators and p is a first private prime number. The system further generates a second presentation H of the ring. H is defined as follows: H=$\langle x,y,t | x^2=0, y^2=0, t=m_1yx, xy+m_2yx+t=1 \rangle$. In addition, $m_1$ and $m_2$ are positive integers and $p+1=m_1+m_2$, wherein t is a generator and the first presentation G and the second presentation H are isomorphic. The system further produces a public ring $\hat{H}$ that is fully homomorphically encrypted, where:

$$\hat{H} = \left\langle x, y, t \mid N \cdot 1 = 1, x^2 = 1, y^2 = 0, \right.$$
$$\left. xyx = x, yxy = y, tx = 0, yt = 0, t^2 = t + \frac{m_2^2 - m_2}{m_1} tyx \right\rangle,$$

N=pq and further, q is a second private prime number, and the public ring $\hat{H}$ is further, publically available. A corresponding method is also disclosed.

14 Claims, 9 Drawing Sheets

(58) Field of Classification Search
USPC .......................................................... 380/28
See application file for complete search history.

(56) References Cited

U.S. PATENT DOCUMENTS

| | | | | |
|---|---|---|---|---|
| 2005/0002532 A1* | 1/2005 | Zhou | ...................... | H04L 9/302 380/277 |
| 2007/0274518 A1* | 11/2007 | Futa | ...................... | H04L 9/3093 380/30 |
| 2012/0167087 A1* | 6/2012 | Lee | ...................... | G06F 9/45558 718/1 |

OTHER PUBLICATIONS

Brakerski, Zvika, et al., "Efficient Fully Homomorphic Encryption from (Standard) LWE", FOCS 2011, 97-106, IEEE Computer Soc., Los Alamitos, CA, 2011.

Ducas, Leo, et al., "FHEW: Bootstrapping Homomorphic Encryption in less than a second", preprin, http://eprint.iacr.org/2014/816.

Halevi, Shai, et. al., "Algorithms in HElib", CRYPTO 2014, Lecture Notes Computer Sci., 8616, 554-571.

Brakerski, Zvika, et al., "Fully Homomorphic Encryption without Bootstrapping", ITCS 2012—Proceedings of the 3rd Innovations in Theoretical Computer Science Conference, pp. 309-325.

Ostrovsky, Rafail, et al., "Communication Complexity in Algebraic Two-Party Protocols", CRYPTO '08, Lecture Notes Computer Sci. 5157 (2008), 379-396.

Van Dijk, M., et al., "Fully Homomorphic Encryption over the integers", Advances in Cryptology-EUROCRYPT 2010, Lecture Notes Comput. Sci. 6110, (2010), 24-43.

Grigoriev, D. et al., "Yao's millionaires' problem and decoy-based public key encryption by classical physics", J. Foundations Comp. Sci. 25 (2014), 409-417.

Halevi, S., et al, "Helib—An Implementation of homomorphic encryption", https://github.com/shaih/HElib/, Accessed Jul. 2014.

Kassabov, M., "Presentations of matrix rings", Groups, Complexity, Cryptology, 2 (2010), 51-57.

Lyndon, R.C., et al., Combinatorial Group Theory, Ergebnisse der Mathematik, band 89, Springer 1977, Reprinted in the Springer Classics in Mathematics series, 2000.

Mikhalev, A.A., et al., "Combinatorial Methods: Free Groups, Polynomials, and Free Algebras", Springer-Verlag, New York 2003.

Myasnikov, A.G., et al., "Non-commutative cryptography and complexity of group-theoretic problems", Amer. Math. Soc. Surveys and Monographs, 2011.

Shpilrain, V., et al., "Embeddings of hypersurfaces in affine spaces", J. Algebra 239 (2001), 161-173.

Shpilrain, V., et al., Factor algebras of free algebras: on a problem of G. Bergman, Bull. London Math. Soc. 35 (2003), 706-710.

Cavallo, B., et al., "Efficient and Secure Delegation of Group Exponentiation to a Single Server", RFIDsec 2015, Lecture Notes Comp. Sc. 9440 (2015), 156-173.

* cited by examiner

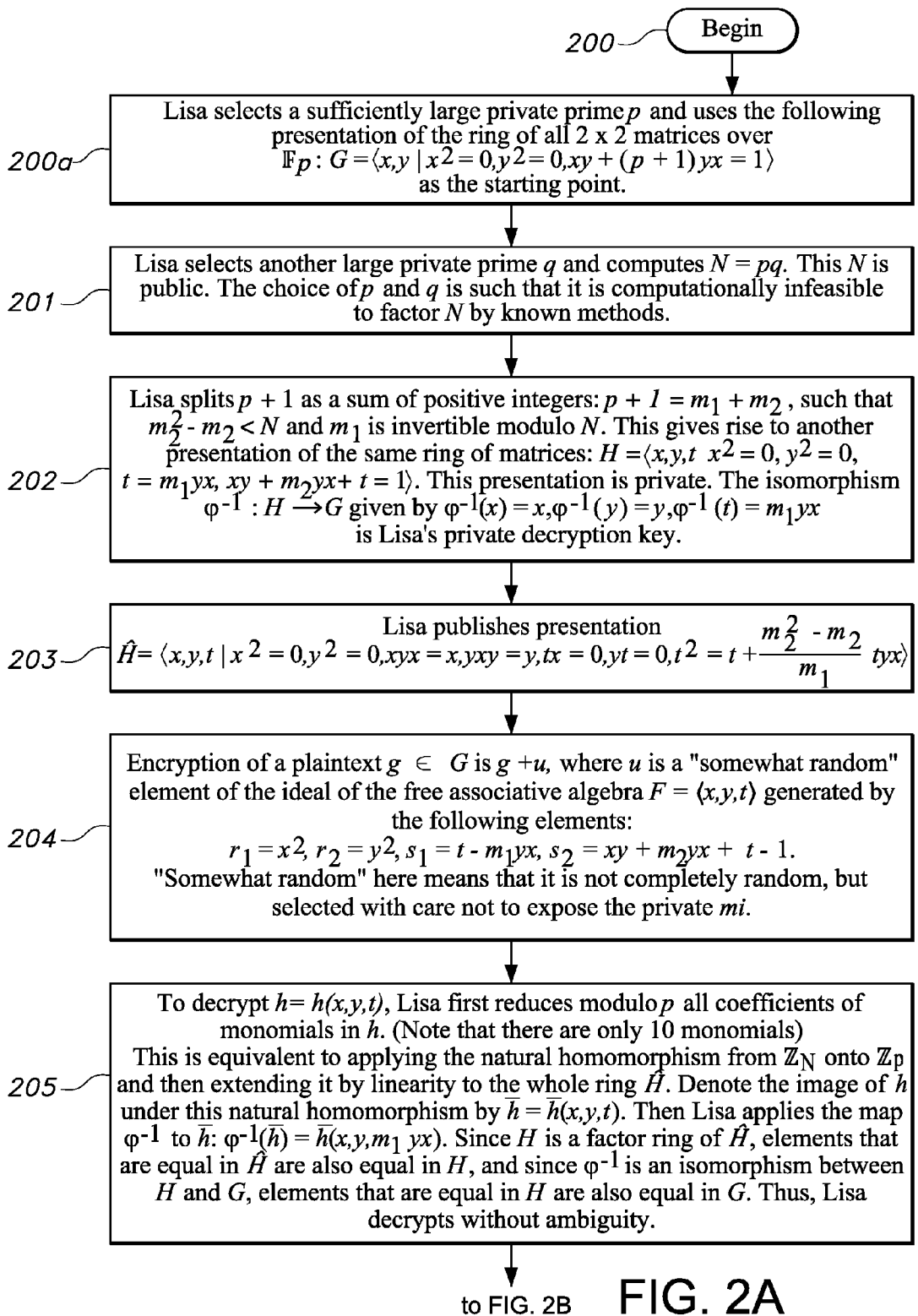

FIG. 2A

200 Begin

200a — Lisa selects a sufficiently large private prime $p$ and uses the following presentation of the ring of all 2 × 2 matrices over $\mathbb{F}_p$: $G = \langle x,y \mid x^2 = 0, y^2 = 0, xy + (p+1)yx = 1 \rangle$ as the starting point.

201 — Lisa selects another large private prime $q$ and computes $N = pq$. This $N$ is public. The choice of $p$ and $q$ is such that it is computationally infeasible to factor $N$ by known methods.

202 — Lisa splits $p + 1$ as a sum of positive integers: $p + 1 = m_1 + m_2$, such that $m_2^2 - m_2 < N$ and $m_1$ is invertible modulo $N$. This gives rise to another presentation of the same ring of matrices: $H = \langle x,y,t \mid x^2 = 0, y^2 = 0, t = m_1 yx, xy + m_2 yx + t = 1 \rangle$. This presentation is private. The isomorphism $\varphi^{-1} : H \rightarrow G$ given by $\varphi^{-1}(x) = x, \varphi^{-1}(y) = y, \varphi^{-1}(t) = m_1 yx$ is Lisa's private decryption key.

203 — Lisa publishes presentation
$\hat{H} = \langle x,y,t \mid x^2 = 0, y^2 = 0, xyx = x, yxy = y, tx = 0, yt = 0, t^2 = t + \dfrac{m_2^2 - m_2}{m_1} tyx \rangle$

204 — Encryption of a plaintext $g \in G$ is $g + u$, where $u$ is a "somewhat random" element of the ideal of the free associative algebra $F = \langle x,y,t \rangle$ generated by the following elements:
$r_1 = x^2, r_2 = y^2, s_1 = t - m_1 yx, s_2 = xy + m_2 yx + t - 1$.
"Somewhat random" here means that it is not completely random, but selected with care not to expose the private $m_i$.

205 — To decrypt $h = h(x,y,t)$, Lisa first reduces modulo $p$ all coefficients of monomials in $h$. (Note that there are only 10 monomials) This is equivalent to applying the natural homomorphism from $\mathbb{Z}_N$ onto $\mathbb{Z}_p$ and then extending it by linearity to the whole ring $\hat{H}$. Denote the image of $h$ under this natural homomorphism by $\bar{h} = \bar{h}(x,y,t)$. Then Lisa applies the map $\varphi^{-1}$ to $\bar{h}$: $\varphi^{-1}(\bar{h}) = \bar{h}(x,y,m_1 yx)$. Since $H$ is a factor ring of $\hat{H}$, elements that are equal in $\hat{H}$ are also equal in $H$, and since $\varphi^{-1}$ is an isomorphism between $H$ and $G$, elements that are equal in $H$ are also equal in $G$. Thus, Lisa decrypts without ambiguity.

to FIG. 2B

SYSTEM AND METHOD FOR PRIVATE-KEY FULLY HOMOMORPHIC ENCRYPTION AND PRIVATE SEARCH BETWEEN RINGS

CROSS-REFERENCE TO RELATED APPLICATIONS

This application claims the benefit of U.S. Provisional Application No. 62/045,200, filed on Sep. 3, 2014, the specification of which is incorporated by reference herein in its entirety for all purposes.

FIELD OF THE DISCLOSURE

The present disclosure relates to a system and method for fully homomorphic encryption (FHE) scheme based on homomorphisms between rings thereby enabling greater efficiency for computations on encrypted data and is based on private-key encryption.

BACKGROUND

Homomorphic encryption (HE) is a type of encryption that permits various operations to be performed on encrypted data. A characteristic of homomorphic is that the output of the mathematical functions on the encrypted data, after being decrypted, matches the output of mathematical function performed on the underlying unencrypted data.

Homomorphic encryption enables performing arithmetic operations on encrypted data without knowledge of any secret decryption key. Most HE schemes to date have followed Gentry's or similar encryption schemes, but these schemes, that can generally evaluate low-depth circuits, remain inefficient due to required bootstrapping.

A fully homomorphic encryption scheme generally allows the computation of arbitrary functions over encrypted data without requiring the use of a decryption key. Homomorphic encryption is desired in a wide variety of fields that use cryptology. However, one drawback, is that homomorphic encryption and decryption algorithms tend to be processor-intensive and inefficient.

The most widely known existing solution to the fully homomorphic encryption problem is attributable to Craig Gentry with relevant software currently under development by IBM. This solution relies in its security on variants of the bounded-distance decoding problem that has the property of random self-reducibility. While this property has been shown to provide good evidence of security, the resulting homomorphic encryption algorithm is too inefficient to be practical in its application.

Accordingly, this solution is too inefficient to be practical. As a point of comparison and to further illustrate the point, Gentry's algorithm takes about 1800 seconds to encrypt a database with $10^6$ entries, whereas the disclosed algorithm takes about 5 seconds (non-optimized). The disclosed algorithm is useful for doing private searches on an encrypted database as well as private information retrieval.

By way of background, ciphertext is also known as encrypted or encoded information because it contains a form of the original plaintext that is unreadable by a human or computer without the proper cipher to decrypt it. Ciphertex is the result of encryption performed on plaintext using an algorithm, called a cipher. A homomorphism is a structure preserving map between two algebraic structures (such as groups, rings or vector spaces) and is used in enabling computations on encrypted data. Homomorphic encryption is a form of encryption that allows computations to be carried out on ciphertext, thus generating an encrypted result which, when decrypted, matches the result of operations performed on the plaintext.

Homomorphic encryption is considered a desirable feature in modern communication system architectures. Homomorphic encryption permits the chaining together of different services without exposing the data to each of those services. A cryptosystem that supports arbitrary computation on ciphertexts is known as fully homomorphic encryption (FHE) and is considered more powerful than homomorphic encryption. Such a scheme enables the construction of programs for any desirable functionality, which can be run on encrypted inputs to produce an encryption of the result. Since such a program need never decrypt its inputs, it can be run by an untrusted party without revealing its inputs and internal state. Therefore, the existence of an efficient and fully homomorphic cryptosystem would have great practical implications in the outsourcing of private computations, for instance, in the context of cloud computing.

In order to provide semantic security, encryption has to be randomized but, on the other hand, a homomorphism should map zero to zero. In order to resolve this conflict, the ciphertext zero is "masked" by "noise". However, during any computation on encrypted data, this "noise" tends to accumulate and has to be occasionally reduced by recryption (a process also known as "bootstrapping") that produces the equivalent ciphertext but, with less noise. Even further, recryption is an expensive procedure and in effect, limits real-life applications of existing FHE solutions such as the solution proposed by Gentry.

There were other proposed solutions for fully homomorphic encryption following Gentry's such as methods disclosed by Z. Brakerski and V. Vaikuntanathan, *Efficient fully homomorphic encryption from (standard) LWE*, In: FOCS 2011, 97-106, IEEE Computer Soc., Los Alamitos, Calif., 2011; M. van Dijk, C. Gentry, S. Halevi, and V. Vaikuntanathan, *Fully homomorphic encryption over the integers*, In: Advances in Cryptology—EUROCRYPT 2010, Lecture Notes Comput. Sci. 6110 (2010), 24-43; or L. Ducas and D. Micciancio, *FHE Bootstrapping in less than a second*, preprint, http://eprint.iacr.org/2014/816. However, each of these methods generally implement bootstrapping techniques and thus, are also considered inefficient for similar reasons described in connection with Gentry's proposed solution.

An improved homomorphic encryption algorithm with increased efficiency on computation of encrypted data is therefore desired.

It is further desirable to implement a new practical private-key fully homomorphic encryption scheme based on homomorphisms between rings. Such FHE scheme would be implemented in conducting private search and private information retrieval on an encrypted database as well as for delegating computations on private data to a remote server, such as a cloud.

It is further desirable to implement a system and method using an FHE scheme that is unconditionally (i.e., without any computational assumptions) secure against ciphertext-only attack.

It is further desirable to provide a system and method with practical instantiation of an FHE scheme whereby resultant computation on encrypted data is accomplished without accumulating noise and is in orders of magnitude more efficient than currently available implementations.

It is yet further desirable to provide a system and method that implements unconditional ciphertext security for encryption of nonzero elements, even if the public is able to recognize encryptions of zero (0). This system and method achieves a very efficient private search on encrypted database without sacrificing any privacy of the data.

It is yet further desirable to provide a system and method that is private-key. Such a FHE private-key environment provides flexibility in terms of how much information the data owner is willing to give to the entity that stores (and operates on) any such encrypted data. In particular, this can provide a customer (including a company that holds sensitive data) with a "toolbox" for building their own instantiation of a general FHE scheme, so that any third party systems outside of the company would not have access to details of the encryption/decryption mechanisms, even though the public may be able to access and operate on encrypted data. This system and method would render "security through obscurity" impossible for FHE schemes, so while there should be some minimum amount of information available to the public, this minimum is essentially just the general framework.

SUMMARY

The present system relates to a system for producing a public ring that is fully homomorphically encrypted. The system comprises a processor configured to generate a first presentation G of a ring, where $G=\langle x,y|x^2=0,y^2=0,xy+(p+1)yx=1\rangle$, where x and y are generators and p is a first private prime number. The system further generates a second presentation H of the ring. H is defined as follows:

$$H=\langle x,y,t|x^2=0,y^2=0,t=m_1yx,xy+m_2yx+t=1\rangle.$$

In addition, $m_1$ and $m_2$ are positive integers and $p+1=m_1+m_2$, wherein t is a generator and the first presentation G and the second presentation H are isomorphic. The system further produces a public ring $\hat{H}$ that is fully homomorphically encrypted, where:

$$\hat{H} = \left\langle x, y, t \mid N \cdot 1 = 1, x^2 = 1, y^2 = 0, \right.$$

$$\left. xyx = x, yxy = y, tx = 0, yt = 0, t^2 = t + \frac{m_2^2 - m_2}{m_1}tyx \right\rangle,$$

N=pq and further, q is a second private prime number, and the public ring $\hat{H}$ is further, publically available. In an embodiment, the computing device is further configured to query the public ring $\hat{H}$ for an encrypted data element. In a further embodiment, the computing device is further configured to decrypt the encrypted data element.

In yet another embodiment, disclosed is a system for producing a public ring that is fully homomorphically encrypted using a processor. The processor is configured to provide a public ring S and provide a private database $D \leq \mathbb{Z}_N$, select a private ideal I of the ring S, and compute a factor ring R=S/I. The processor is further configured to embed elements of the database D in factor ring R by mapping the number I to a random idempotent of the ring R. The processor additionally encrypts elements of ring R by adding to each element of ring R, a random element of the private ideal I and, further outputs an encrypted collection of elements of S. In an additional embodiment, the system is further configured to comprise a public ring S generated by $v_1, \ldots, v_n$. In a further embodiment, the system further comprises the collection of elements of S being generated in terms of $v_1, \ldots, v_n$.

In another embodiment, disclosed is system for decrypting a public ring that is fully homomorphically encrypted using a computing device. The computing device is configured for providing elements $u=u(v_1, \ldots, v_n)$ of the ciphertext u, the ciphertext u being in terms of the generators S. The computing device further computes a private linear combination of other $v_i$ in order to determine u' wherein, u' is associated with a Ring R. The system further comprising the computing device determining $k \in \mathbb{Z}_N$, wherein $k \in \mathbb{Z}_N$ is associated with the Ring R and further identifying a private idempotent associated with the Ring R based on $k \in \mathbb{Z}_N$. The system outputs a number associated with $k \in \mathbb{Z}_N$. In yet another embodiment, the system further comprises $u'=u'(v_1, \ldots, v_{j-1}, v_{j+1}, \ldots, v_n) \in R$. In yet a further embodiment, the system further comprises determining $k \in \mathbb{Z}_N$, wherein $u'=k \cdot r$, and $r=\alpha(I)$.

The present method relates to a method for producing a public ring that is fully homomorphically encrypted using a computing device. The computing device is configured for generating a first presentation G of a ring, where: $G=\langle x,y|x^2=0,y^2=0,xy+(p+1)yx=1\rangle$. Furthermore, x and y are generators and p is a first private prime number. The computing device also generates a second presentation H of the ring, where $H=\langle x,y,t|x^2=0,y^2=0,t=m_1yx,xy+m_2yx+t=1\rangle$, $m_1$ and $m_2$ are positive integers and $p+1=m_1+m_2$. Furthermore, t is a generator and the first presentation G and the second presentation H are isomorphic. The method also produces a public ring $\hat{H}$ that is fully homomorphically encrypted, where:

$$\hat{H} = \left\langle x, y, t \mid N \cdot 1 = 1, x^2 = 1, y^2 = 0, \right.$$

$$\left. xyx = x, yxy = y, tx = 0, yt = 0, t^2 = t + \frac{m_2^2 - m_2}{m_1}tyx \right\rangle,$$

In the disclosed method, N=pq where q is a second private prime number. Furthermore, in the disclosed method, the public ring $\hat{H}$ is publically available. In an additional embodiment, the method further comprises querying the public ring $\hat{H}$ for an encrypted data element.

In yet another embodiment, disclosed is a method of fully homomorphically encryption using a computing device. The computing device is configured for providing a first presentation of a first ring using a first ring of matrices, selecting a large private prime number p, and selecting a second large private prime number q. The disclosed method further comprising computing N=pq, the N being public and generating a second presentation of the first ring using the first ring of matrices, wherein the second presentation is private. The disclosed method further comprises generating an isomorphism, the isomorphism being a private decryption key, and encrypting a plaintext using somewhat random elements of an Ideal, the somewhat random elements being used to maintain element $m_i$ private. In yet another embodiment, the method further comprises querying the public ring $\hat{H}$ for an encrypted data element. In yet another embodiment, the method further comprises decrypting the encrypted data element.

In yet another disclosed embodiment, the method relates to a method for producing a public ring that is fully homomorphically encrypted using a computing device. The computing device is configured for providing a public ring S, providing a private database $D \leq \mathbb{Z}_N$, and selecting a private ideal I of the ring S. The present method further comprises computing a factor ring R=S/I and embedding elements of the database D in factor ring R by mapping the number I to a random idempotent of the ring R. The disclosed embodiment further comprises encrypting elements of ring R by adding to each element of ring R a random element of the private ideal I and outputting an encrypted collection of elements of S. In yet a further embodiment, the disclosed method further comprises the public ring S being generated by $v_1, \ldots, v_n$. In yet a further embodiment, the present method further comprises the collection of elements of S being generated in terms of $v_1, \ldots, v_n$.

In yet a further embodiment, disclosed is a method for decrypting a public ring that is fully homomorphically encrypted using a computing device. The computing device is configured for providing elements $u=u(v_1, \ldots, v_n)$ of the ciphertext u, the ciphertext u being in terms of the generators S. The computing device further computing a private linear combination of other $v_i$ in order to determine u' wherein u' is associated with a Ring R and determining $k \in \mathbb{Z}_N$ wherein $k \in \mathbb{Z}_N$ is associated with the Ring R. The computing device is further configured for identifying a private idempotent associated with the Ring R based on $k \in \mathbb{Z}_N$, and outputting a number associated with $k \in \mathbb{Z}_N$. In yet a further embodiment, the disclosed method further comprises $u'=u'(v_1, \ldots, v_{j-1}, v_{j+1}, \ldots, v_n) \in R$. In yet a further embodiment, the disclosed method further comprises determining $k \in \mathbb{Z}_N$, wherein $u'=k \cdot r$, and $r=\alpha(I)$.

BRIEF DESCRIPTION OF THE DRAWINGS

FIG. 2A is a flow chart of an exemplary method of the protocol for homomorphic encryption by an isomorphism and subsequent private query against encrypted database.

It is to be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

Figure 1:
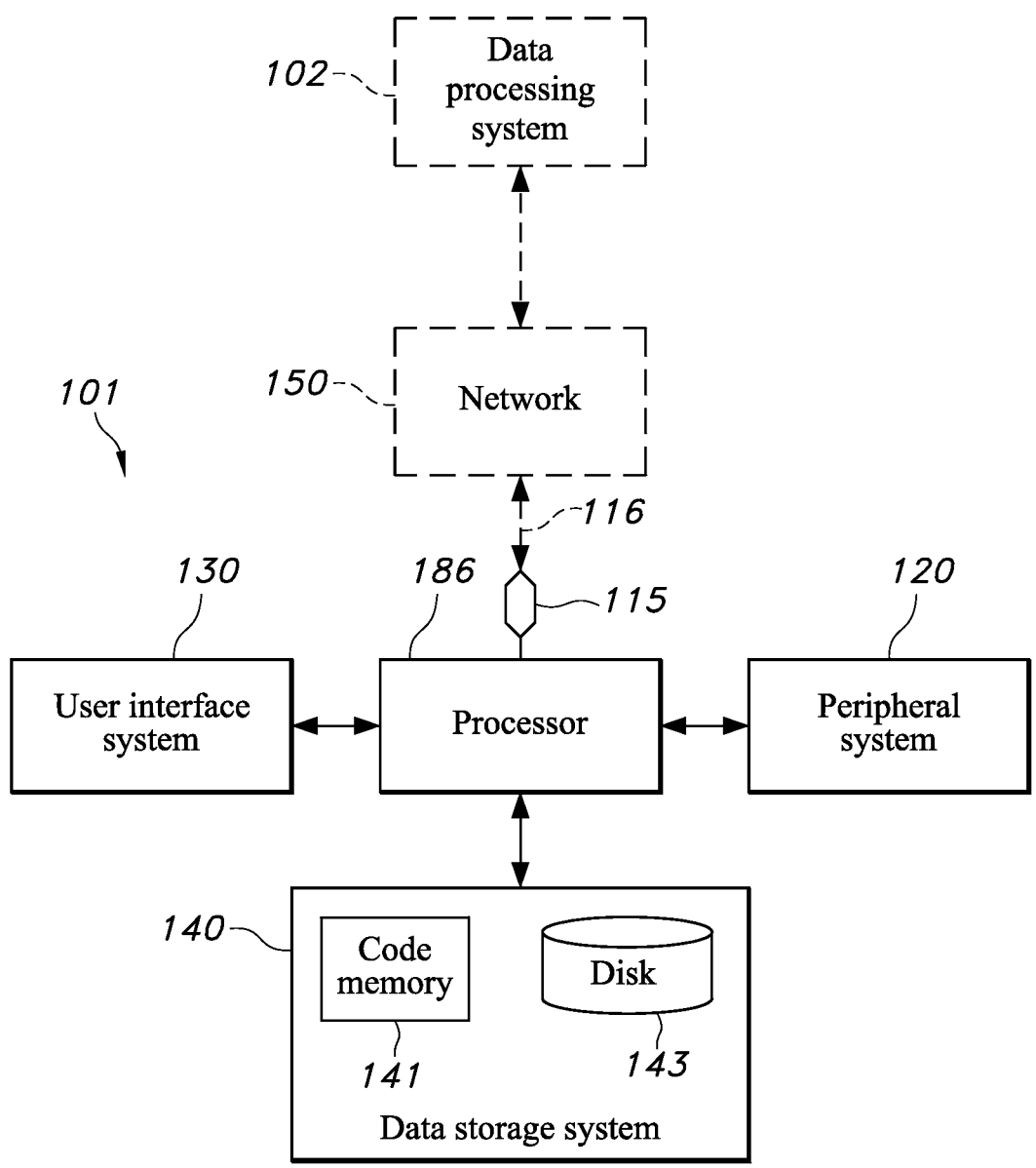
FIG. 1 is a block diagram illustrating an embodiment of the system configuration for implementing a fully homomorphic encryption (FHE) scheme between rings.

FIG. 1 is a high-level block diagram showing the components of an exemplary embodiment of the disclosed system including a data-processing system 101 for analyzing data and performing other analyses described herein, and related components. The system 101 includes a processor 186, a peripheral system 120, a user interface system 130, and a data storage system 140. The peripheral system 120, the user interface system 130 and the data storage system 140 are communicatively connected to the processor 186. Processor 186 can be communicatively connected to network 150 (shown in phantom), e.g., the Internet or a leased line, as discussed below. Processor 186, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 186 can implement processes of various aspects described herein, e.g., processes for determining shared secrets. Two peers who wish to communicate, e.g, Lisa and Bob, can each have a processor 186 or a data processing system (FIG. 1). In this example, Lisa has system 101 and Bob has corresponding system 102 (which can include the same types of components as system 101); the two are communicatively connected via the network 150. Each system 101, 102 executes computer program instructions to exchange data and perform calculations so that Lisa and Bob share a secret value (e.g., a multiprecision integer or bit array) without ever having transmitted the secret across the network 150.

Processor 186 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 186 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 120, user interface system 130, and data storage system 140 are shown separately from the data processing system 186 but can be stored completely or partially within the data processing system 186.

The peripheral system 120 can include one or more devices configured to provide digital content records to the processor 186. For example, the peripheral system 120 can include digital still cameras, digital video cameras, cellular phones, or other data processors. The processor 186, upon receipt of digital content records from a device in the peripheral system 120, can store such digital content records in the data storage system 140.

The user interface system 130 can include a mouse, a keyboard, another computer (connected, e.g., via a network or a null-modem cable), or any device or combination of devices from which data is input to the processor 186. The user interface system 130 also can include a display device, a processor-accessible memory, or any device or combination of devices to which data is output by the processor 186. The user interface system 130 and the data storage system 140 can share a processor-accessible memory.

In various aspects, processor 186 includes or is connected to communication interface 115 that is coupled via network link 116 (shown in phantom) to network 150. For example, communication interface 115 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 115 sends and receives electrical, electromagnetic or optical signals that carry digital or analog data streams representing various types of information across network link 116 to network 150. Network link 116 can be connected to network 150 via a switch, gateway, hub, router, or other networking device.

Processor 186 can send messages and receive data, including program code, through network 150, network link 116 and communication interface 115. For example, a server can store requested code for an application program (e.g., a JAVA applet) on a tangible non-volatile computer-readable storage medium to which it is connected. The server can retrieve the code from the medium and transmit it through network 150 to communication interface 115. The received code can be executed by processor 186 as it is received, or stored in data storage system 140 for later execution.

Data storage system 140 can include or be communicatively connected with one or more processor-accessible memories configured to store information. The memories can be, e.g., within a chassis or as parts of a distributed system. The phrase "processor-accessible memory" is intended to include any data storage device to or from which processor 186 can transfer data (using appropriate components of peripheral system 120), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 140 can be a tangible non-transitory computer-readable storage medium, i.e., a non-transitory device or article of manufacture that participates in storing instructions that can be provided to processor 186 for execution.

In an example, data storage system 140 includes code memory 141, e.g., a RAM, and disk 143, e.g., a tangible computer-readable rotational storage device such as a hard drive. Computer program instructions are read into code memory 141 from disk 143. Processor 186 then executes one or more sequences of the computer program instructions loaded into code memory 141, as a result performing process steps described herein. In this way, processor 186 carries out a computer implemented process. For example, steps of methods described herein, blocks of the flowchart illustrations or block diagrams herein, and combinations of those, can be implemented by computer program instructions. Code memory 141 can also store data, or can store only code.

The various disclosed embodiments provide establishment of shared secrets that can be used for data communications. A technical effect of the various embodiments is to present a visual indication on a display screen (e.g., in user interface system 130) that an encrypted data element has been identified that matches a query.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 186 (and possibly also other processors), to cause functions, acts, or operational steps of various aspects herein to be performed by the processor 186 (or other processor). Computer program code for carrying out operations for various aspects described herein may be written in any combination of one or more programming language(s), and can be loaded from disk 143 into code memory 141 for execution. The program code may execute, e.g., entirely on processor 186, partly on processor 186 and partly on a remote computer connected to network 150, or entirely on the remote computer.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transient computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention has been described in detail with particular reference to certain preferred aspects thereof, but it will be understood that variations, combinations, and modifications can be effected by a person of ordinary skill in the art within the spirit and scope of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In a disclosed embodiment, homomorphic encryption is implemented to conduct private searching on an encrypted database. A fully homomorphic encryption function E encrypts elements of a ring and respects both ring operations: $E(g_1 g_2) = E(g_1)E(g_2)$ and $E(g_1 + g_2) = E(g_1) + E(g_2)$ for any two elements $g_1, g_2$ of the ring in question. Alternatively, one can encrypt Boolean circuits, and then a fully homomorphic encryption function E should respect both AND and OR operations.

An embodiment is disclosed in which homomorphic encryption is implemented to conduct private searching on an encrypted database based directly on a fully homomorphic encryption on a ring. Private search is typically implemented based on fully homomorphic encryption.

As an example of the disclosed embodiment, database owner, Lisa wants to determine whether or not $E(x)$ is in the (encrypted) database D. Note that the problem is that the encryption $E(x)$ has to be randomized, which means that every time Lisa encrypts the same x the result looks different. This deprives the database keeper (for example, the cloud) from just matching $E(x)$ to element(s) of the database. The database keeper, for each element $E(y)$ of the database, computes $E(x)-E(y)$, which is equal to $E(x-y)$ because the encryption function E respects the addition. Then the product is computed using the following equation:

$$P(x) = \Pi_{E(y) \in D}(E(x) - E(y)) = \Pi_{E(y) \in D} E(x-y)$$

This product is computed using the equation indicated above, across all elements of the database D, and $P(x)$ is thereby transmitted to Lisa. Since the encryption function E respects the multiplication, too, the element $P(x)$ is equal to $E(\Pi_{E(y) \in D}(x-y))$.

Lisa then decrypts this element to recover $\Pi_{E(y) \in D}(x-y)$. If all plaintexts y are elements of a field (or more generally, of a ring without zero divisors), then the latter product is equal to 0 if and only if $x=y$ for at least one y such that $E(y)$ is stored in the database D. Thus, Lisa will know whether or not $E(x)$ is in the database D but, this alone will not be an indication of how many occurrences of $E(x)$ there are in D (in case there are some).

The same disclosed method can actually be used if plaintexts are elements of a ring with zero divisors, provided that there are not "too many" of them, meaning that the probability to have $ab=0$ for nonzero a, b is negligible. Thus, a small probability of a "false positive" response to a query is permitted, while the probability of a "false negative" response is 0 since $ab \neq 0$ implies $a \neq 0$ and $b \neq 0$.

In the disclosed embodiment, $\varphi: G \to H$ is defined as an isomorphism between two rings, G and H, with $g_1, \ldots, g_r$ being generators of G and $h_1, \ldots, h_s$ being generators of H. In the event of a $g \in G$, $E(g) = u_g(h_1, \ldots, h_s)$, where $u_g(h_1, \ldots, h_s) = \varphi(g)$ in H, with (randomized) encryption of elements of the ring G by expressions in the generators of the ring H. Since any isomorphism between two rings respects addition as well as multiplication, this encryption is fully homomorphic. Again, since $\varphi$ is an isomorphism, there is the inverse map $\varphi^{-1}$ (which is also an isomorphism) that Lisa will use for decryption. Lisa therefore keeps $\varphi^{-1}$ private.

In another embodiment, Lisa conducts a query $E(x)$ to the encrypted database D. Bob computes $E(x)-E(y)$ for each element $E(y)$ of the database. Since the encryption function E respects the addition, this is equal to $E(x-y)$. Then Bob computes $P(x)=\Pi_{E(y)\in D}(E(x)-E(y))=E(\Pi_{E(y)\in D}(x-y))$ and transmits P(x) (as an expression in the generators of H) to Lisa. Lisa applies the map and keeps $\varphi^{-1}$ to P(x) to recover $\varphi^{-1}(P(x))=\Pi_{E(y)\in D}(x-y)$.

Lisa then compares the element $\varphi^{-1}(P(x))$ to 0 in the ring G. For an appropriate choice of a ring G, with overwhelming probability, this element is equal to 0 in G if and only if at least one y=x. Therefore, Lisa will determine whether or not x=y for some y such that E(y) is in the database D, and her conclusion will be correct with overwhelming probability.

A platform ring and presentations G and H of this ring are implemented in the disclosed embodiment, so that Bob could do computation in H without an overwhelming size in the number of outputs. However, this actually encompasses two conflicting trends. In order for Bob to be able to do computation in H without blowing up the size of the outputs, there has to be a mechanism in H for reducing long expressions to expressions of bounded length, without changing an element of H represented by a given expression. This kind of mechanism in algebra is generally referred to as "reducing to a normal form". On the other hand, if there is such a mechanism in H, there might be a conflict with semantic security because the same element g∈G will correspond to the same "normal form" in H no matter how many times g is encrypted.

Therefore, in such event, instead of giving out the ring presentation H to Bob, Lisa selects presentations G and Ĥ such that:

(a) Ĥ has a factor ring Ĥ/R=H isomorphic to G;
(b) The rings G and H are small compared to the ring Ĥ. If all these rings are finite, this just means that the ratio $$\frac{|G|}{|\hat{H}|}$$

is negligiale; and (c) Every element of the ring Ĥ has a compact presentation (of size no more than a few thousand bits, for example). Also, given any two elements $y_1, y_2$ of Ĥ, Bob should be able to efficiently locate a compact presentation of $y_1 y_2$ and $y_1+y_2$.

Step (c) basically provides that elements of Ĥ have a "normal form", so the next issue is why is this not in contradiction with semantic security? First, the encryption of the 0 element of G is analyzed to determine why it is not the 0 element of Ĥ, and further, with overwhelming probability. Indeed, the 0 element $0_G$ is encrypted to $\varphi(0_G)=0_H$. The 0 element of H, further randomized by relators of H, for example, encryptions of $0_G$ that Bob is keeping in the database D which are $E(0_G)=0_H+r_i$ for some elements $r_i$ equal to 0 in H. Therefore, a random element (or a random expression in the generators of H) that is equal to 0 in H is not going to be equal to 0 in Ĥ with overwhelming probability if H is very small relative to Ĥ. Therefore, the following specific platforms are implemented as described herein below.

In a preferred embodiment, fully homomorphic encryption from isomorphisms between rings is implemented. Disclosed is a general method for homomorphic encryption in any ring G given by generators and defining relations (a.k.a. defining relators). Even further, for an embodiment using a practical implementation, a ring of 2×2 matrices over $\mathbb{F}_p$ is implemented for a sufficiently large p.

The general idea of homomorphic encryption provides for encrypting with an isomorphism φ and decrypt with (private) $\varphi^{-1}$. Both φ and $\varphi^{-1}$ should be efficiently computable (by Lisa, the private key holder). The way to achieve this is building φ as a composition of "elementary", easily invertible, isomorphisms. These "elementary" isomorphisms are defined herein as Tietze transformations. Tietze considered sequences of elementary isomorphisms of groups, or even a more recent source (targeted at applications of group theory to cryptography) is the monograph. These Tietze transformations are, in fact, universal in the sense that they can be applied to any presentation of a (semi)group, or a ring, or any algebraic structure whatsoever, (for example, (commutative algebras or non-commutative algebras). Tietze provided that two groups given by generators and defining relations $\langle x_1, x_2, \ldots | r_1, r_2, \ldots \rangle$ and $\langle x_1, x_2, \ldots | s_1, s_2, \ldots \rangle$ are isomorphic if and only if one can get from one of the presentations to the other by a sequence of simple transformations of special kinds.

In another preferred embodiment the platform ring: 2×2 matrices over $\mathbb{F}_p$ are implemented. The ring G is the ring of all 2×2 matrices over $\mathbb{F}_p$ for a sufficiently large private p. "Sufficiently large" is defined herein as the size of our platform ring should at least be larger than the size of the database that is to be encrypted. In fact, to prevent "brute force" kinds of attacks, p has to be at least $2^t$, where t is the security parameter. As an example, the following presentation of the ring G, (due to Kassabov [M. Kassabov, *Presentations of matrix rings*, Groups, Complexity, Cryptology 2 (2010), 51-57]) is implemented:

$$G = \langle x, y | x^2=0, y^2=0, xy+(p+1)yx=1 \rangle$$

The interpretation of the generators x and y by matrices is:

$$x = \begin{pmatrix} 0 & 1 \\ 0 & 0 \end{pmatrix}, y = \begin{pmatrix} 0 & 0 \\ 1 & 0 \end{pmatrix}.$$

It might be desirable to replace p+1 by 1 in the displayed presentation above since we are describing matrices over $\mathbb{F}_p$. However, this would be erroneous in the application herein because the above presentation provides that the ring is the factor ring of the free associative ring generated by x and y, by the ideal generated (as an ideal) by 3 elements: $x^2, y^2$, and xy+(p+1)yx−1. Therefore, p+1 cannot be replaced by 1 in the above embodiment.

There are some useful consequences observed of the relations in the above presentation of G. The last relation can be re-written as xy+pyx=1−yx. If the system multiplies it by x on the right, the result is xyx=x (because $x^2=0$). If the system now multiplies it by x on the left and use relations $x^2=0$ and xyx=x, the result is now px=0. Similarly, the result is py=0, and then from the relation xy+(p+1)yx=1, the result p·1=0. Thus, may be implemented in an embodiment is replace p+1 by 1 in the displayed presentation above, but with the addition of at least the relation py=0. However, in another embodiment, it is further desirable to hide p, and this will be easier implemented if the last relation is used in the above presentation of G, as opposed to using py=0.

Yet another presentation H of the same ring is disclosed as a further embodiment. First the system splits the number p+1 as a sum p+1=m1+m2 of two positive integers. The presentation is:

$$H = \langle x, y, t | x^2=0, y^2=0, t=m_1 yx, xy+m_2 yx+t=1 \rangle.$$

The ring H is obviously isomorphic to G because a new generator t is introduced therein and then "eradicated" by making it equal to an expression in the old generators. The last relation in the presentation of H follows from the above-described last relation in the presentation of G and relation $t=m_1yx$. Thus, the ring itself has not changed.

The explicit (as a map on the generators) isomorphism $\varphi: G \to H$ is trivial: $\varphi(x)=x, \varphi(y)=y$. It is $\varphi^{-1}$ that is nontrivial: $\varphi^{-1}(x)=x, (\varphi^{-1}(y)=y, \varphi^{-1}(t)=m_1yx$.

Since just applying $\varphi$ to any element $g \in G$ does not change the appearance of g, this by itself is not an encryption, so the essential part of encryption in this case is actually randomization. In particular, 0 can be encrypted by any element of the ideal of the free associative algebra $F=\langle x,y,t \rangle$ generated by the following elements:

$$r_1=x^2, r_2=y^2, s_1=t-m_1yx, s_2=xy+m_2yx+t-1.$$

Since this ideal has infinitely many elements, producing a random element from this ideal is next performed. In one embodiment, the system precomputes sufficiently many elements of this ideal with degrees of all monomials bounded by some reasonable n, and then selects a random element out of that pool. Other intelligent algorithms may be implemented in order to avoid any of $m_i$ "sticking out".

Note that the element $s_2-s_1$ is exactly the last relation in Kassabov's presentation of G above. Therefore, all elements of the ideal generated by Kassabov's relations of G also belong to the ideal generated by $r_1, r_2, s_1, s_2$. This includes the element pyx. Now adding pyx to $s_1: s_1+pyx=t-m_1yx+pyx=t+(m_2-1)yx$ and, further denote $s_3=t+(m_2-1)yx$.

Random linear combinations of $s_1$ and $s_3$ is of the form $c_1s_1+c_2s_2=(C_1+c_2)t+(c_2(m_2-1)-c_1m_1)yx$. Element of this form can be an encryption, in particular, of many different elements of the form $\lambda yx+\mu(xy-1)$ for various integers $\lambda$ and $\mu$, including $\lambda=\mu=0$. Indeed, an encryption of $\lambda yx+\mu(xy-1)$ can be $\lambda yx+\mu xy-\mu+(k_1+k_2)t+(k_2(m_2-1)-k_1m_1)yx=(k_1+k_2)t+(k_2(m_2-1)-k_1m_1+\lambda)yx+\mu(1-m_2yx-t)-\mu=(k_1+k_2-\mu)t+(k_2(m_2-1)-k_1m_1+\lambda-\mu m_2)yx$ for some integers $k_1, k_2$. For the many possible combinations of $\lambda$ and $\mu$, there are integers $k_1, k_2, m_1, m_2$ such that $k_1+k_2-\mu=c_1+c_2$ and $k_2(m_2-1)-k_1m_1+\lambda-\mu m_2=c_2(m_2-1)-c_1m_1$.

From the first equation, $\mu=k_1+k_2-c_1-c_2$. This is further implemented in the second equation to obtain $k_2m_2-k_2-k_1m_1+\lambda+c_1$ $m_2+c_2m_2-k_1m_2-k_2m_2=c_2m_2-c_2-c_1m_1$. After simplifying, the following results are achieved:

$$\lambda=(k1-c1)(m1+m2)+k2-c2=(k1-c1)(p-1)+k2-c2.$$

The displayed equality provides that for any $c_1$ and $c_2$, there are infinitely many pairs $(\lambda, \mu)$ such that the same expression $(c_1+c_2)t+(c_2(m_{2\_1})-c_1m_1)yx$ can be an encryption of $\lambda yx+\mu(xy-1)$.

Looking specifically at encryptions of 0, for example, in the case where $\lambda=\mu=0$, if $\mu=0$, then from the above expression for $\mu$ we have $k_1+k_2=c_1+c_2$. $\lambda$ is next re-written as:

$$\lambda=(k_2-k_1)+(c_1-c_2)(k_1-c_1)p=(k_2-k_1)+(c_1-c_2)(\bmod p).$$

If $\lambda=0$, then $(k_2-k_1)+(c_1-c_2)=0 \pmod p$, so along with $k_1+k_2=c_1+c_2$, this yields $k_1=c_1 \pmod p$ and $k_2=c_2 \pmod p$.

Therefore, for Lisa who knows p and works in the ring G where $p=0$, encryption of 0 is considered unique. At the same time, for a user who does not know p, encryption of 0 is not unique because the system of two equations $k_1+k_2=c_1+c_2, (k_2-k_1)+(c_1-c_2)+(k_1-c_1)p=0$ has many solutions, for different values of p. These different possible values of p and the corresponding solutions for $k_1, k_2$ can be called "decoys" of the actual values. The idea of decoy-based security was previously used for certain kinds of encryption and for secure delegation of computation.

In a preferred embodiment, the computing in public ring $\hat{H}$ is disclosed. Producing a public ring $\hat{H}$ is provided such that: (1) H is a factor ring of $\hat{H}$; (2) H is "very small" compared to $\hat{H}$; (3) computation in $\hat{H}$ can be performed efficiently and without an overwhelming number of outputs which can overwhelm the system and the ability to process such encryption. Two tools are implemented: (i) dropping some of the relations from the presentation of H; (ii) producing some consequences of some of the relations from the presentation of H and then dropping the original relations. Below is described a preferred embodiment, wherein the number $N=pq$ is a product of p with another (private) prime q.

$$\hat{H} = \left\langle x, y, t \mid N \cdot 1 = 0, x^2 = 0, y^2 = 0, \right.$$
$$\left. xyx = x, yxy = y, tx = 0, yt = 0, t^2 = t + \frac{m_2^2 - m_2}{m_1}tyx \right\rangle$$

In such case, $$\frac{m_2^2 - m_2}{m_1}$$

is considered an element of $\mathbb{Z}/N\mathbb{Z}$ and in particular, in the event Lisa selects $m_1$, the system has to make sure that it is invertible in $\mathbb{Z}/N\mathbb{Z}$.

Since in the presentation of H, $t=m_1yx$, this along with $x^2=0, y^2=0$ implies $tx=0, yt=0$. The relations $xyx=x, yxy=y$ follow from the last relation in the presentation of H, together with $tx=0, yt=0$. Finally, the last relation in $\hat{H}$ is obtained as further described below. From the last relation of H, we have $t-1=-m_2yx-xy$. After squaring both sides, $(t-1)^2=m_2^2yx+xy$ (note that $(xy)^2=xy$ and $(yx)^2=yx$, whereas $(xy)(yx)=(yx)(xy)=0$) results. This result is further re-written as $m_2^2yx+xy$ as $m_2yx+xy+(m_2^2-m_2)yx$. Using the last relation of H again, replace $m_2yx+xy$ by $1-t$. Thus, the relation$(t-1)^2=1-t+(m_2^2-m_2)yx$ or $t^2=t+(m_2^2-m_2)yx$ is obtained. Finally, using the relation $t=m_1yx$ in H, the system will further replace yx by $$\frac{1}{m_1}tyx$$

to get $$t^2 = t + \frac{m_2^2 - m_2}{m_1}tyx.$$

In yet another embodiment, the above presentation of $\hat{H}$ is made public. Bob can perform computation in $\hat{H}$ efficiently and without rendering an overwhelming size of outputs and rendering the system inoperable or otherwise inefficient in its operations.

In the event of monomials that only involve x and/or y, these can always be efficiently reduced to length at most 2 by using the relations $x^2=0, y^2=0, xyx=x, yxy=y$.

In the event of monomials that only involve t, using the last relation in the presentation of $\hat{H}$, any power of t can be efficiently expressed as a linear combination of tyx and yx. Thus, the only monomial that only involves t is t.

In the event of monomials that only involve x and t, since $tx=0$ and $x^2=0$, the only monomial that only involve x and t is xt.

In the event of monomials that only involve y and t, the only such monomial is similarly, ty.

In the event of monomials that involve x, y and t, for example, monomials tyx, yxt. Since $(yx)^2=yx$, then $tyxt=t^2$. Since no other monomials in x and/or y can be between two subsequent occurrences of t, it is then apparent that the only ("irreducible") monomials that involve all the letters x, y and t are tyx and yxt.

As a result, it is apparent that any element of $\hat{H}$ is a linear combination of the following 10 monomials: 1, x, y, t, xy, yx, xt, ty, tyx, and yxt. Coefficients at these monomials are integers modulo N. Therefore, there is no blowing up of the size of outputs or rendering an overwhelming number of outputs during any computation in H.

It can be further deduced therefore, that the size of H is $p^4$, whereas the size of $\hat{H}$ is at least $N^4$. The ring H is isomorphic to G, the ring of all 2×2 matrices over $\mathbb{F}_p$, and therefore, its size is $p^4$. The ring $\hat{H}$ consists of all linear combinations of 10 monomials (as described hereinabove) with coefficients from $\mathbb{Z}/N\mathbb{Z}$. Some of these monomials may be linearly dependent over $\mathbb{Z}/N\mathbb{Z}$. However, it is further observed that the following 4 monomials are linearly independent: x, y, xy, yx. Indeed, by the construction of the ring $\hat{H}$, it maps homomorphically onto the ring of 2×2 matrices over $\mathbb{Z}/N\mathbb{Z}$ by way of the map that takes x to x, y to y, and t to $m_1yx$. Therefore, if x, y, xy, and yx were linearly dependent in $\hat{H}$, their images under the above homomorphism would be linearly dependent in the ring of matrices over $\mathbb{Z}/N\mathbb{Z}$.

However, these images correspond to the following matrices:

$$x = \begin{pmatrix} 0 & 1 \\ 0 & 0 \end{pmatrix}, y = \begin{pmatrix} 0 & 0 \\ 1 & 0 \end{pmatrix}, xy = \begin{pmatrix} 1 & 0 \\ 0 & 0 \end{pmatrix}, xy = \begin{pmatrix} 0 & 0 \\ 0 & 1 \end{pmatrix},$$

and these matrices are obviously linearly independent. Thus, all linear combinations of x, y, xy, yx with coefficients from $\mathbb{Z}/N\mathbb{Z}$ are different elements of $\hat{H}$, which means that $\hat{H}$ has at least $N^4$ elements.

In fact, the size of $\hat{H}$ is probably close to $N^{10}$, but proving linear independence of monomials that include t would be harder. In any case, for 512-bit primes p and q, the ratio $$\frac{p^4}{N^4}$$

is about $2^{-2000}$ which is already "as negligible as it gets". In effect, the condition that the rings G and H are small compared to the ring $\hat{H}$ is thereby met. And, if all these rings are finite, this effect also would result in the ratio $$\frac{|G|}{|\hat{H}|}$$

being negligible.

Figure 2B:
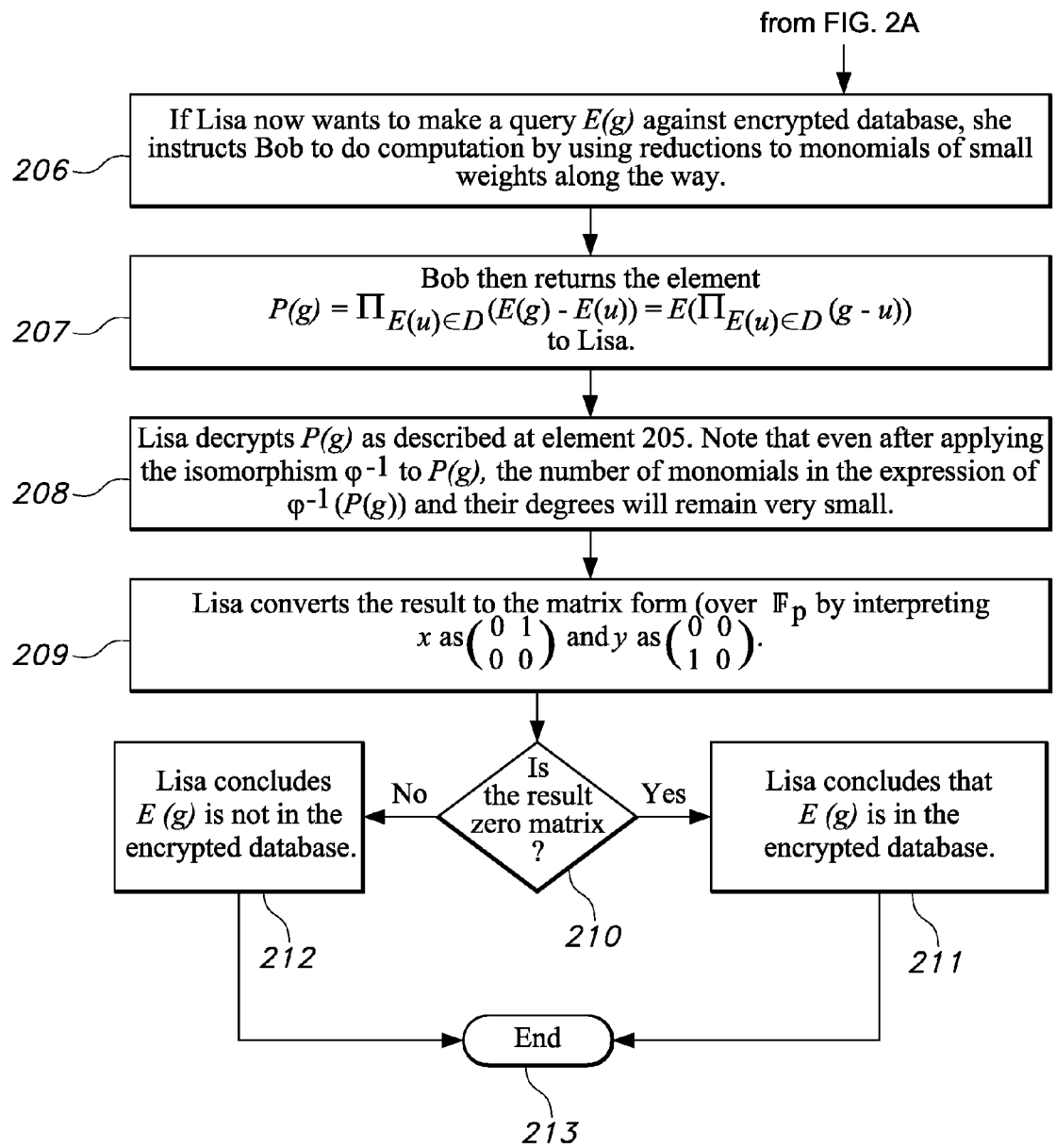
FIG. 2B is a flow chart of the exemplary method of the protocol for homomorphic encryption by an isomorphism and subsequent private query against encrypted database which method is partially illustrated in FIG. 2A.

A summary of the protocol as implemented by the system in the described embodiment is illustrated in FIGS. 2A and 2B. A step-by-step description of the protocol for an embodiment of homomorphic encryption by an isomorphism and subsequent private query against encrypted database is shown and described in FIGS. 2A and 2B.

The process begins at step 200. Database owner, Lisa, selects using for example, a computing device or processor, at step 200(*a*), a sufficiently large private prime p and uses the following presentation of the ring of all 2×2 matrices over $\mathbb{F}_p$: $G=\langle x,y | x^2=0, y^2=0, xy+(p+1)yx=1 \rangle$ as the starting point. In step 201, Lisa selects another large private prime q and computes N=pq. This N is public. The choice of p and q is such that it is computationally infeasible to factor N by known methods. Lisa next proceeds to step 202 and splits p+1 as a sum of positive integers: $p+1=m_1+m_2$, such that $m_2^2-m_2<N$ and $m_1$ is invertible modulo N. This gives rise to another presentation of the same ring of matrices: $H=\langle x,y,t | x^2=0, y^2=0, t=m_1yx, xy+m_2yx+t=1 \rangle$.

It is further noted that presentation is private. The isomorphism $\varphi^{-1}: H \to G$ given by $\varphi^{-1}(x)=x, \varphi^{-1}(y)=y, \varphi^{-1}(t)=m_1yx$ is Lisa's private decryption key.

In step 202, Lisa publishes presentation $$\hat{H} = \left\langle x, y, t \mid x^2 = 0, y^2 = 0, xyx = x, \right.$$
$$\left. yxy = y, tx = 0, yt = 0, t^2 = t + \frac{m_2^2 - m_2}{m_1} tyx \right\rangle.$$

The process proceeds to step 203 in which encryption of a plaintext $g \in G$ is g+u, and further it is noted that u is a "somewhat random" element of the ideal of the free associative algebra $F=\langle x,y,t \rangle$ generated by the following elements: $r_1=x^2, r_2=y^2, s_1=t-m_1yx, s_2=xy+m_2yx+t-1$. "Somewhat random" is defined herein as not completely random, but selected with care so as not to expose the private $m_i$, as described hereinabove.

In order to decrypt h=h(x,y,t), Lisa first reduces modulo p all coefficients of monomials in h as indicated in step 205 noting that there are 10 monomials. This is equivalent to applying the natural homomorphism from $\mathbb{F}_N$ onto $\mathbb{F}_p$ and then extending it by linearity to the whole ring $\hat{H}$. The image of h is thereby denoted under this natural homomorphism by $\bar{h}=\bar{h}(x,y,t)$. Lisa next applies the map $\varphi^{-1}$ to $\bar{h}: \varphi^{-1}(\bar{h})=\bar{h}(x,y,m_1yx)$. Since H is a factor ring of $\hat{H}$, elements that are equal in $\hat{H}$ are also equal in H, and since $\varphi^{-1}$ is an isomorphism between H and G, elements that are equal in H are also equal in G. Thus, Lisa decrypts without ambiguity.

At step 206 of FIG. 2B, if Lisa proceeds to make a query E(g) against encrypted database, she instructs Bob to perform computations as described hereinabove by using reductions to monomials of small weights along the way, as described hereinabove.

Bob then returns the element using for example, a computing device or processor, $P(g)=\Pi_{E(u) \in D}(E(g)-E(u))=E(\Pi_{E(u) \in D}(g-u))$ to Lisa in step 207.

Proceeding to step 208, Lisa next decrypts P(g) in accordance with step 205 of this protocol. Note that even after applying the isomorphism $\varphi^{-1}$ to P(g), the number of monomials in the expression of $\varphi^{-1}(P(g))$ and their degrees will remain very small. Lisa next converts the result to the matrix form (over $\mathbb{F}_p$ by interpreting x as $$\begin{pmatrix} 0 & 1 \\ 0 & 0 \end{pmatrix}$$

and y as $$\begin{pmatrix} 0 & 0 \\ 1 & 0 \end{pmatrix}.$$

The result is next queried at step 210 to determine if a zero matrix. If the result is the zero matrix at step 211, Lisa concludes that E(g) is in the encrypted database. Otherwise, at step 212, Lisa concludes it is not an encrypted database and the process ends at step 213.

Figure 3:
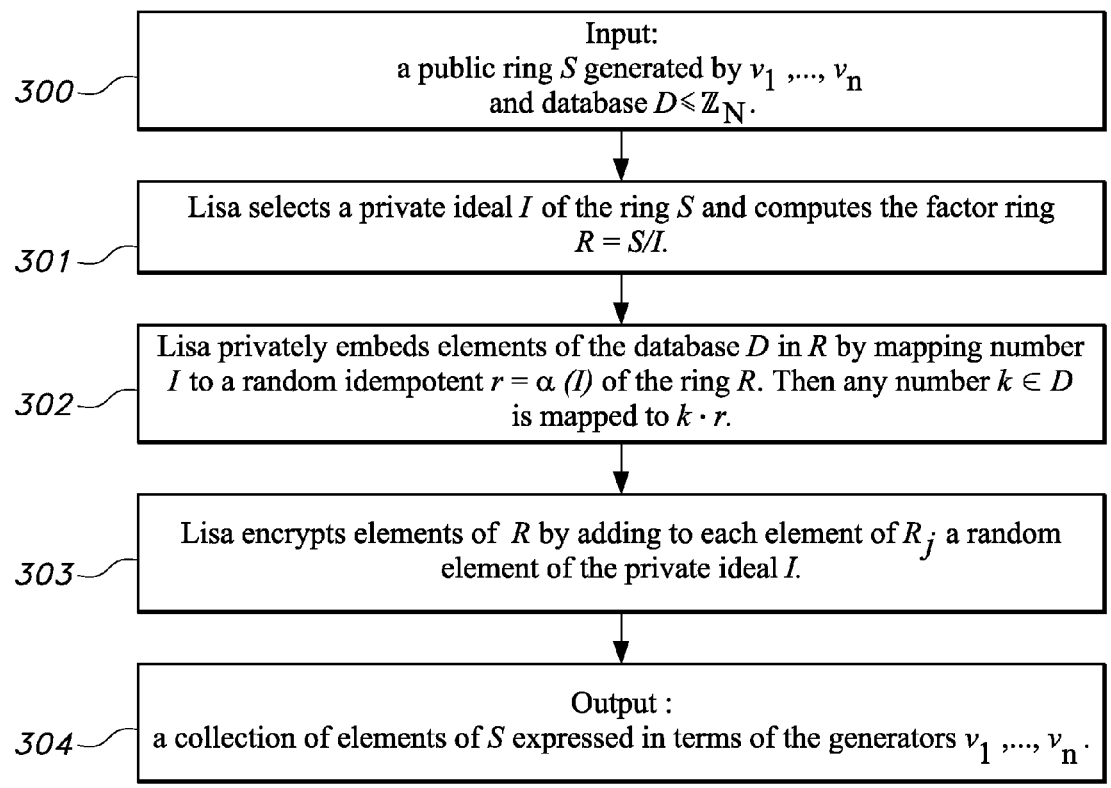
FIG. 3 is a flow chart of an exemplary method for encryption of a private database $D \leq \mathbb{Z}_N$.

FIG. 3 illustrates an embodiment of a method for encryption of a private database $D \leq \mathbb{Z}_N$. In step 300, shown are inputs to the encryption system, specifically, a public ring S generated by $v_1, \ldots, v_n$ as well as private database $D \leq \mathbb{Z}_N$. The database owner, Lisa, using for example, a computing device or processor, next selects a private ideal I as shown in step 301. Lisa next computes the factor ring R=S/I. Next, the system proceeds in step 302 to privately embed elements of the database D in R by mapping number I to a random indempotent r=α(I) of the ring R. Subsequently, any number k∈D is mapped to k·r as shown in step 302. The method continues at step 303 with encrypting R by adding to each element of Rj, a random element of the private ideal I. At step 304, the output disclosed method is a collection of elements of S expressed in terms of the generators $v_1, \ldots, v_n$.

Figure 4:
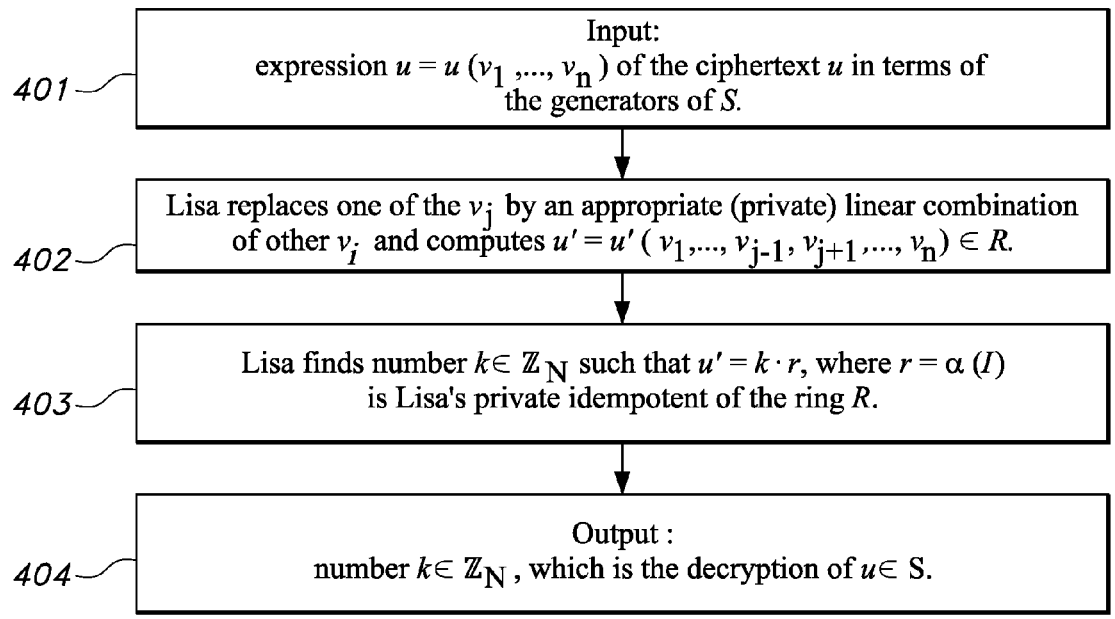
FIG. 4 is a flow chart of an exemplary method for decryption of a ciphertext $\mu \subset S$.

FIG. 4 illustrates an embodiment of a method for decryption of a ciphertext U∈S by the database owner, Lisa. The method commences at step 401 with an input to the system of expression $u=u(v_1, \ldots, v_n)$ of the ciphertext u in terms of the generators of S. The database owner, Lisa, using for example, a computing device or processor, replaces one of the $v_j$ by an appropriate (private) linear combination of other $v_i$ as shown in step 402. The method next computes at step 402 $u'=u'(v_1, \ldots, v_{j-1}, v_{j+1}, \ldots, v_n) \in R$. Proceeding to the next step 403, database owner, Lisa, finds number $k \in \mathbb{Z}_N$ such that u'=k·r, where r=α(I) is considered Lisa's private idempotent of the ring R. The output of the method is $k \in \mathbb{Z}_N$, which is the decryption of U∈S as shown in step 404.

Figure 5:
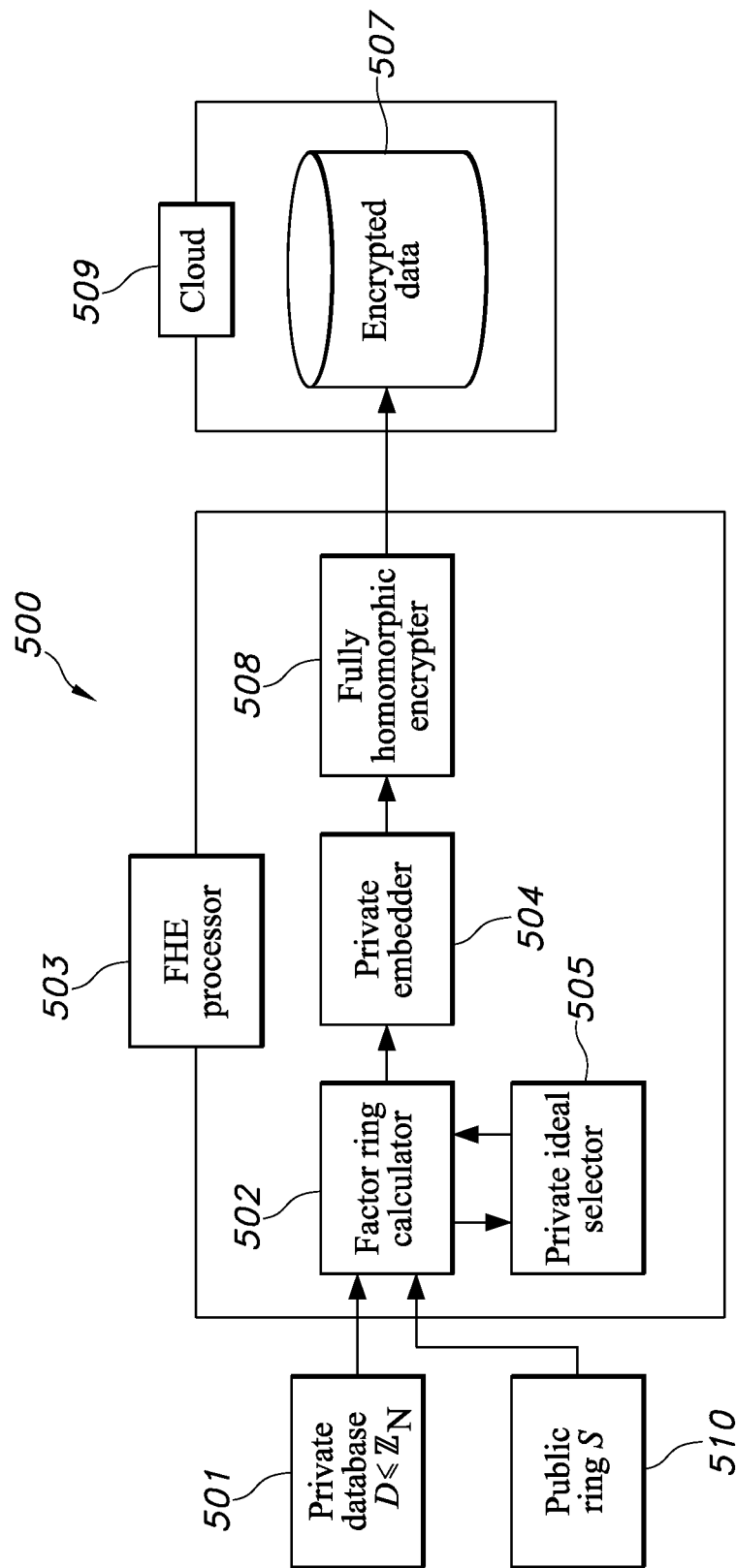
FIG. 5 is a block diagram illustrating an example of a configuration of the fully homomorphic encryption protocol for encryption of a private database, $D \leq \mathbb{Z}_N$.

FIG. 5 is a block diagram in accordance with an embodiment of a system for encryption 500 of a private database $D \leq \mathbb{Z}_N$. The fully homomorphic encryption processor 503 includes a factor ring calculator 502, private ideal selector 505, private embedder unit 504 and fully homomorphic encrypter 508. Inputs to the encryption system 500, are a public ring S 510 generated by $v_1, \ldots, v_n$ as well as private database $D \leq \mathbb{Z}_N$. A private ideal I selector 505 selects the private ideal I. The factor ring calculator 502 computes the factor ring R=S/I. The system proceeds using private embedder 504 to privately embed elements of the database D in R by mapping number I to a random indempotent r=α(I) of the ring R. Subsequently, any number k∈D is mapped to k·r. The fully homomorphic encrypter 508 encrypts R by adding to each element of Rj, a random element of the private ideal I. The output is a collection of elements of S expressed in terms of the generators $v_1, \ldots, v_n$ which is stored in a database of encrypted data 507 which may be located in a cloud 509 computing environment.

Figure 6:
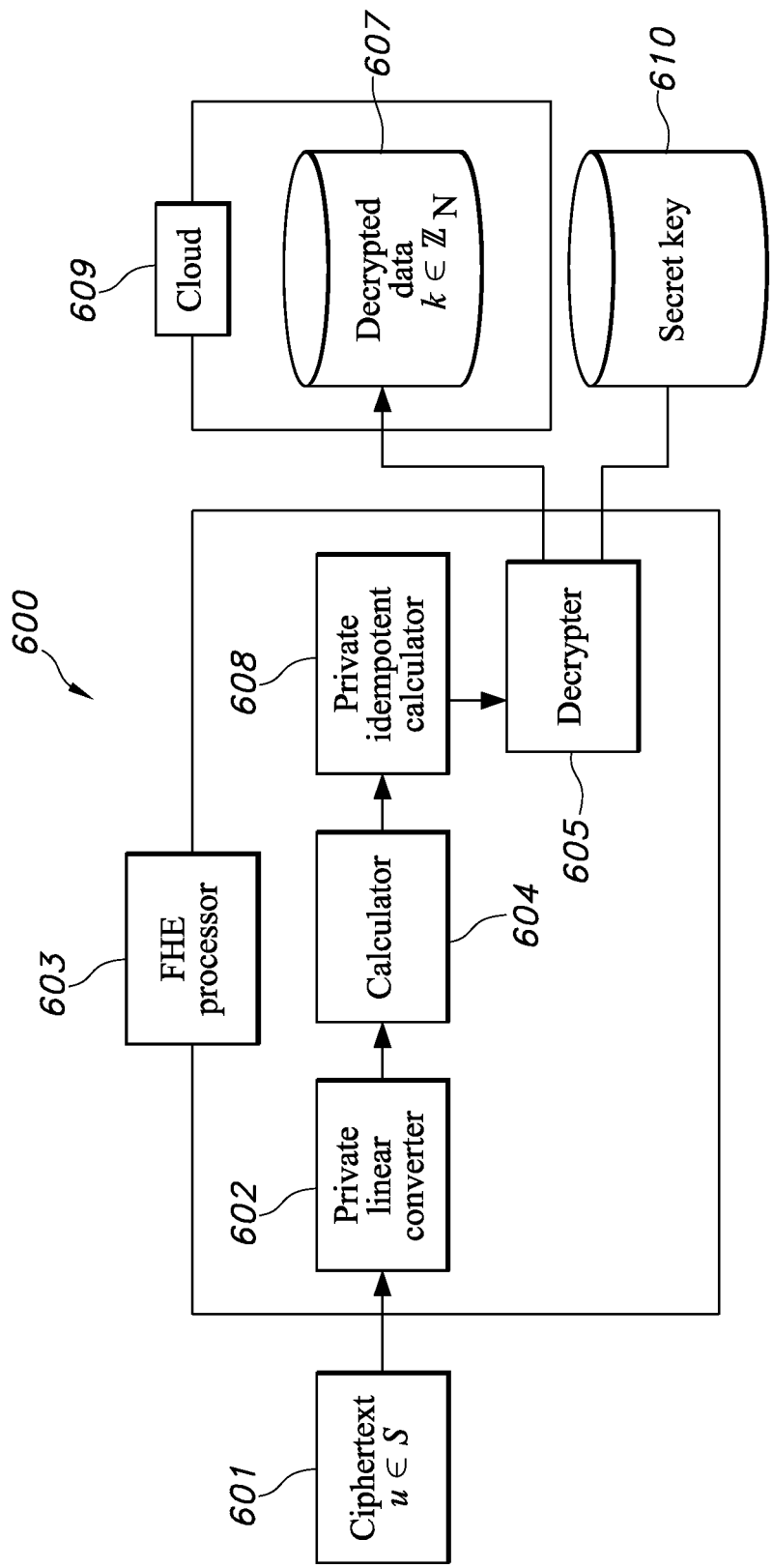
FIG. 6 is a block diagram illustrating an example of a configuration of the fully homomorphic encryption protocol for decryption of a ciphertext $U \in S$.

FIG. 6 is a block diagram in accordance with an embodiment of a system for decryption of a ciphertext U∈S by the database owner. The input 601 to the FHE processor 603 is expression $u=u(v_1, \ldots, v_n)$ of the ciphertext u in terms of the generators of S or U∈S. The private linear converter 602 next replaces one of the $v_1$ by an appropriate (private) linear combination of other $v_i$. A calculator 604 performs related computations including $u'=u'(v_i, \ldots, v_{j-1}, v_{j+1}, \ldots, v_n) \in R$.

The private idempotent calculator 608 next retrieves the number $k \in \mathbb{Z}_N$ such that u'=k·r, where r=α(I) is considered the private idempotent of the ring R. The decrypter 605 outputs $k \in \mathbb{Z}_N$, which is the decryption of U∈S. The decrypted data $k \in \mathbb{Z}_N$ is stored in database 607, and furthermore, may be stored within a cloud 609 computing environment. Any generated secret key may be stored in secret key database 610 as part of the disclosed embodiment of the decryption process.

In yet another disclosed embodiment, computer implemented protocols relevant to private searching on an encrypted database are implemented. The probability of a "false positive" result of an encrypted query to an encrypted database in the protocol can be assessed or, the probability for a product of n nonzero 2×2 matrices over $\mathbb{F}_p$ to be equal to the zero matrix.

Therefore, for a prime number p, a stream of random nonzero 2×2 matrices over $\mathbb{F}_p$ are generated and multiplied together until the product becomes the zero matrix. This protocol is repeated with many different primes p, in the range from $10^2$ to $10^7$, and a product of fewer than 10p matrices is not generated that would be equal to the zero matrix. Therefore, the probability of a "false positive" result of a query in the protocol (for example, using a database with $<10^{15}$ entries) is well under $$\frac{1}{10p},$$

which is less than $2^{-500}$ if a 500-bit p is used (in order to guarantee the infeasibility of factoring N=pq). Thus, the probability is really negligible.

In order to evaluate performance of an embodiment of the fully homomorphic encryption system and method, as a benchmark, performance data of the IBM's HElib package based on Gentry's algorithm was implemented. It was determined that encryption of a database with $10^6$ entries by using HElib, takes about 30 minutes, or 1,800 seconds. Using the disclosed method, several elements of the relevant (private) ideal can be pre-computed as described hereinabove. Subsequently, for encryption, the system uses just linear combinations of pre-computed elements with random coefficients from $\mathbb{F}_p$. This allows the system to encrypt a database with $10^6$ entries in just a few seconds.

Computations involved in responding to an encrypted query as described hereinabove takes more time. A protocol is implemented by multiplying M elements (where M is the number of entries in the database), each of which is a linear combinations of 10 monomials with coefficients from $\mathbb{F}_p$. It appears that this computation should take 100M multiplications in $\mathbb{F}_p$. However, using the specific type of monomials allow one to reduce the number of multiplications to about 10M. As an example, the response time to an encrypted query to a database with $10^7$ entries will be about 10 seconds. For a private information retrieval using simple dichotomy, the system multiplies this number by $\log_2 M$, so the timing us about 200 seconds, which is still quite practical during implementation.

Therefore, the disclosed benefits of implementing a fully homomorphic encryption algorithm based on isomorphisms between rings as applied to the problem of private search on an encrypted database becomes apparent. The security of the decryption key in the disclosed embodiment is based on intractability of factoring large integers. The comparison of performance of the homomorphic encryption algorithm against algorithms based on Gentry's known approach reveals the disclosed protocols using algorithm with 1024- bit public key is approximately 500 times faster when used on a database with $10^6$ entries.

In yet another disclosed embodiment, the FHE is a private-key scheme which permits a greater range of flexibility in terms of how much information the database owner is willing to provide to the entity that stores (and operates on) encrypted data. In particular, this can provide a customer using such a system (example, a company that holds sensitive data) with a "toolbox" for building their own instantiation of our general FHE scheme, so that a third party outside a company or entity would not know details of the encryption/decryption mechanisms, even though the public should be able to operate on encrypted data. The latter requirement makes "security through obscurity" impossible for FHE schemes, so there would be a minimum amount of information available to the public, and this minimum is essentially just the general framework.

In the disclosed embodiment, plaintexts are elements of a private ring R. Ciphertexts are elements of a public ring S, such that $R \subset S$ is a subring of S. The ring S also has a (private) ideal I such that S/I=R', where the ring R' is isomorphic to R. (In addition, the ring R' may be just equal to R, in which case R is called a retract of S.) Given $u \in R$, encryption noted as E(u)=u+E(0), where E(0) is a random element of a private ideal $J \subseteq I$ of the ring S. This encryption function is a homomorphism. The function respects addition, and for multiplication the following is indicated: $E(u) E(v)=(u+j_1)(v+j_2)=uv+j_1 u+u j_2+j_1 j_2=uv+j_3=E(uv)$, where $j_1, j_2, j_3 \in J$.

Private decryption key is a map p from S to R' that takes every element of I to 0, followed by an isomorphism, $\varphi: R' \to R$. This scheme is further illustrated in the diagram below as:

$$R \xrightarrow{E} S \xrightarrow{p} R' \xrightarrow{\varphi} R$$

Note that "a public ring S", is defined as providing to the public a collection of rules for adding and multiplying elements of S. Typically, this can be a (finite) set of elements that span S as a linear vector space over some $\mathbb{Z}_N$, together with the multiplication table for S with respect to this set of elements. This protocol achieves unconditional (i.e., without any computational assumptions) security against ciphertext-only attack even in a very simple instantiation of the scheme.

The encryption scheme is private-key, and in particular, no access to the encryption mechanism is provided to any third party or third party system.

As can be appreciated, there is a significant difference in security analysis between public-key and private-key encryption. In particular, "brute force" attacks in the public-key sense (e.g. encryption emulation attack) are usually not applicable if the encryption is private-key, unless "real" plaintexts have some distinctive (for example, non-mathematical) features, such as for example, words that "make sense". To further illustrate this point, if the system encrypts a credit card number by adding to it a random number modulo some p, then this encryption will be perfectly secure against encryption emulation attack, although completely insecure against known-plaintext attack (KPA).

However, the disclosed scheme, FHE is a rather special case because even if the encryption itself is private-key, some information has to be made public because otherwise, the public will not be able to operate on encrypted data, and this will defy the purpose of FHE. However, in the disclosed embodiments, the system may still take full advantage of encryption being private-key, and this allows the system, in particular, to make the scheme unconditionally (i.e., without any computational assumptions) secure against ciphertext-only attack.

In the event data does not have a ring structure, for example, if a database consists of credit card numbers (or phone numbers, etc.), there is no need to multiply them, although it is necessary to add/subtract their respective encryptions in order to compare the difference to 0 in the course of a private search. Therefore, embedding of the database in the ring R of plaintexts has to be an additive homomorphism, but not necessarily multiplicative.

In the event data do have a ring structure, embedding of the database in the ring R of plaintexts has to be a full homomorphism, i.e., both additive and multiplicative. This case is relevant to the problem of delegating computations to a remote server. This application is also more sensitive from the security point of view.

Referring to the diagram below, shown is the entire encryption-decryption process starting with a real-life database D.

$$D \xrightarrow{\alpha} R \xrightarrow{E} S \xrightarrow{p} R' \xrightarrow{\varphi} R \xrightarrow{\beta} D,$$

where $\beta(\alpha(x))=x$ for any $x \in D$.

The embedding $\alpha$ is either an additive homomorphism (described below as case (1)) or a full homomorphism (described below as case (2)). In either case 0 of D goes to 0 of R because of the additivity, so recognizing encryptions of 0 is an important point in any security analysis.

In case (1), even if the attacker can recognize encryptions of 0, encryptions of nonzero elements are unconditionally secure. That is, even a computationally unbounded attacker cannot recover a nonzero database element from a given ciphertext with non-negligible probability.

Case (2) is more sensitive from the security point of view because not only 0 of D has to go to 0 of R, but also 1 of D has to go to an idempotent element g (i.e., $g^2=g$) of R. Rings R may have in certain embodiments, many nontrivial idempotent elements.

In order to further describe why the disclosed general scheme tends to be unconditionally secure against ciphertext-only attack, consider the following example. Suppose the ring S of ciphertexts is the ring $\mathbb{Z}_{15}$. Then the (private) ring R of plaintexts can be either $\mathbb{Z}_3$ or $\mathbb{Z}_5$. The encryption protocol begins by flipping a coin to choose one of these two rings for our plaintexts. Then there are two possibilities, each with probability ½.

(1) Plaintext ring is $\mathbb{Z}_3$. Then, in particular, 0 can be encrypted as 6, and 1 can be encrypted as 10; or (2) Plaintext ring is $\mathbb{Z}_5$. Then, in particular, 0 can be encrypted as 10, and 1 can be encrypted as 6.

Thus, in the disclosed embodiment, even a computationally unbounded adversary cannot distinguish between encryptions of 0 and 1 with probability >½, based only on ciphertexts. However, this protocol is not secure against known plaintext attack because knowing just one (plaintext, ciphertext) pair reveals the private ring R.

In addition, while, for example, number 7 can be an encryption of either 1 or 2, it cannot be an encryption of 3. In a preferred embodiment, it is preferable where any ciphertext in S could be an encryption of any element of R (depending on a private key that was used for encryption), with approximately the same probability.

In another disclosed embodiment, the public ring S where computations are carried out, is provided by generators and defining relations (or defining relators) as shown in the equation below:

$$S=\langle v_1,\ldots,v_n | N\cdot 1=0, v_i^2=v_i(\text{for all } i), v_i v_j = v_j v_i (\text{for all } i,j)\rangle.$$

The first relation $N\cdot 1=0$ indicates that the ring S is a linear algebra over $\mathbb{Z}_N$. This N should be large enough. In particular, it generally should be larger than the size of the database to be encrypted. On the other hand, the number n of generators should not be too large in the interest of efficiency. n is typically on the order of log log N.

As already described, S is a linear vector space over $\mathbb{Z}_N$. The "standard" basis of this vector space consists of 1 and monomials of the form $v_{i_1},\ldots,v_{i_k}$ with $i_1<i_2<\ldots<i_k$. This is because the ring S is commutative and $v_i^2=v_i$ for all i. The number of these monomials therefore equals the number of subsets of the set of generators, i.e., equals $2^n$, which is on the order of log N.

Computing in the ring S is very similar to computing with polynomials. Addition in S is just adding coefficients at the corresponding monomials. Multiplication amounts to multiplying out "polynomials" in vi the usual way, followed by applying the relations $v_i^2=v_i$.

In the instantiation described hereinbelow, the number of the generators $v_i$ is n=5, and the dimension (=the number of different monomials) is $2^5=32$. Therefore, each multiplication of two elements of S amounts to multiplication of 32×32=1024 monomials (and also their coefficients), simplifying them using $v_i^2=v_i$, and collecting similar terms. Performing one million multiplications like that generally takes about 8 seconds, if N is on the order of 1024 bits. This can be further optimized; in particular, the 32×32 multiplication table for monomials can be pre-programmed and thereby, pre-computed.

In addition, an ideal I is next selected for (randomized) encryptions of 0. a specific value n=5 is used for the number of generators, to simplify the notation. Thus, $$S=\langle v_1,v_2,v_3,v_4,v_5 | N\cdot 1=0, v_i^2=v_i(\text{for all } i), v_i v_j=v_j v_i(\text{for all } i,j)\rangle.$$

is a public ring. A private ring is defined R=S/I and a private ideal $J\subset I$ of the ring S that is used for encryptions of 0.

The ideal I is going to be generated (as an ideal of S) by a single element of S. As an example, the element $v_2-v_1-1$ is used. The ring R is the factor ring S/I. It is spanned, as a linear vector space over $\mathbb{Z}_N$, by $\{1, v_1, v_3, v_4, v_5\}$. In fact, this is a linear basis of R, so presentation of any particular element of R as a linear combination of 1, $v_1$, $v_3$, $v_4$, $v_5$ is unique. This provides many different ways to embed elements of $\mathbb{Z}_m$ in R. Such an embedding can be kept private as well in certain embodiments.

Only the party or system that knows the ideal I can decrypt without ambiguity. For example, the element $1+v_1+v_2+v_3+v_4$ is decrypted as $2+2v_1+v_3+v_4$ if one factors out the ideal I, but it can also be decrypted as $3+v_1+v_2+2v_3$ if one factors out the ideal I' generated, say, by $v_4-v_3-2$.

A disclosed embodiment of the relevant encryption/decryption protocol is further described in connection with FIG. 3. Note that in this protocol, elements of a private ring R are encrypted. This ring is the factor ring of S by a private ideal I. Further described in connection with FIG. 4, is the protocol for embedding elements of a real-life database in R.

Elements of a private ring R are encrypted in which the database owner, Lisa publishes a presentation of the public ring S as follows:

$$S=\langle v_1,\ldots,v_n | N\cdot 1=0, v_i^2=v_i(\text{for all } i), v_i v_j=v_j v_i(\text{for all } i,j)\rangle.$$

The suggested value of n is 5, in which case S will have dimension 32 as a linear vector space over $\mathbb{Z}_N$. Larger values of n are possible, too, but the larger the n, the slower the multiplication in S.

Lisa next generates a private decryption key, which is an ideal I of S generated (as an ideal of S) by a single linear combination of $v_i$ with random coefficients. At least one of the coefficients has to be invertible in $\mathbb{Z}_N$, so that Lisa could express some $v_j$ as a linear combination of other $v_i$. Lisa next sets R=S/I.

In the event of encryption of a plaintext, $u \in R$ is $E(u)=u+E(0)$, where $E(0)$ is a random element of the ideal I.

In the event of decryption of $g(v_1,\ldots,v_n)$, Lisa replaces $v_j$ by the appropriate linear combination of other $v_i$. In such case, Lisa would generate a private decryption key, which is an ideal I of S generated (as an ideal of S) by a single linear combination of $v_i$ with random coefficients. At least one of the coefficients has to be invertible in $\mathbb{Z}_N$, so that Lisa could express some $v_j$ as a linear combination of other $v_i$. Lisa next sets R=S/I.

In yet another described embodiment as shown in connection with the flowcharts of FIGS. 3 and 4 are the fully homomorphic embeddings of $\mathbb{Z}_N$ in the ring S. In particular is the fully homomorphic embeddings $\tau:\mathbb{Z}_N\to S$ are described. It is noted that element g of a ring is called idempotent if $g^2=g$. In a field, the only idempotents are 0 and 1. Under a homomorphism $\tau$, an idempotent has to be mapped to an idempotent, so $\tau(1)$ should be an idempotent element u of S. Then, since $\tau$ is a homomorphism, $\tau(k)=ku$ for any $k\in\mathbb{Z}_N$. Conversely, to any idempotent $g\in S$ (fully homomorphic) embedding can be associated $\tau_g:\mathbb{Z}_N\to S$ that takes 1 to g.

The ring S described above has many idempotents, and therefore there are many fully homomorphic embeddings of $\mathbb{Z}_N$ in this ring. From the associations of $v_i^2=v_i$ it is apparent that each $v_i$ is an idempotent, and since a product of idempotents is again an idempotent, every monomial is an idempotent in S, so there are at least $2^n$ idempotents, where n is the number of generators $v_i$. There are also other idempotents in S, which are not monomials.

As an example, $g=v_i-v_i v_j+v_j$ is an idempotent. The total number of idempotents in S is $2^{2^n}$.

Further disclosed is an embodiment for fully homomorphic embeddings of $\mathbb{Z}_N$ in the factor ring R=S/I. It is noted that if g is an idempotent of S, then for any ideal I of the ring S, the co-set g+I is considered an idempotent of the factor ring R=S/I.

Another embodiment is further disclosed in which additive embeddings of $\mathbb{Z}_N$ in R are implemented. If elements of the original database do not have a ring structure (which is the case, for example, with credit card numbers, phone numbers, etc.), then embedding of the original database in R does not have to be fully homomorphic, but it still has to be an additive homomorphism to enable private search on an encrypted database.

The number of additive embeddings of $\mathbb{Z}_N$ in R is colossal, even for a small number of generators $v_i$. This is because the element 1 of $\mathbb{Z}_N$ in this case can be mapped to any nonzero element u of R, and then any $k\in\mathbb{Z}_m$ is mapped to ku.

If the ring S has 5 generators $v_i$, then it has dimension $2^5=32$ over $\mathbb{Z}_N$, and therefore, the ring R has dimension $2^4=16$ over $\mathbb{Z}_N$, so it has $N^{16}-1$ nonzero elements. Thus, the number of additive embeddings of $\mathbb{Z}_N$ in R is $N^{16}-1$.

In the encryption/decryption protocol as described hereinabove, if the original data does not have a ring structure (for example, data like credit card numbers, or phone numbers, and similar private or personal data.), the disclosed method in an alternative embodiment, provides security for encryption of nonzero elements, even if the public is able to recognize encryptions of 0.

This scenario is due to the fact that the number of additive embeddings of $\mathbb{Z}_N$ into R is colossal (namely, $N^{16}-1$), as described hereinabove. Thus, even if the attacker determines the ideal I of S and therefore, would be able to recover $u \in R$ from E(u), the attacker will not be able to determine $\alpha(1)$ with probability more than $$\frac{1}{N^{16}-1}.$$

Therefore, the attacker would not be able to recover any nonzero original data with non-negligible probability.

In order to accomplish the security of nonzero elements, the original database D is embedded in the ring R by using a (private) random additive in certain embodiments (but not necessarily multiplicative) homomorphism, and then apply fully homomorphic encryption to elements of R. This process permits the private key holder to conduct private search/information retrieval on the encrypted data.

The ability (by the public) to recognize encryptions of zero may be an advantage rather than a disadvantage in some real-life applications (e.g. private search and information retrieval on encrypted database), as long as nonzero elements are secure. For example, if the encrypted data are phone numbers, and the goal is to retrieve upon (encrypted) request, for example, phone calls listed under a particular phone number, then the entity that stores the encrypted database will find the encrypted phone number queried for very efficiently if the system is able to recognize encryptions of zero, and provide information relevant to this phone number without knowing the actual (unencrypted) phone number being queried.

In yet another embodiment, the system proceeds to fully homomorphically embed $\mathbb{Z}_N$ in R. A relevant application of such process is for delegating computations to a remote server. In order to understand what (plaintext, ciphertext) pairs the attacker can possibly determine, the identities satisfied by elements of $\mathbb{Z}_N$ are analyzed because the same identities have to be satisfied by encrypted elements since the encryption is fully homomorphic. All identities of $\mathbb{Z}_N$ follow from: (1) the commutativity identity xy=yx and (2) Euler's generalization of Fermat's little theorem delineated below $\alpha^{\varphi(N)}=1$ for any a coprime with $N$, where $\varphi(N)$ is Euler's function of $N$.

The commutativity identity also holds in the public ring S, so applying this identity to ciphertexts will not provide any useful information to the attacker or adversary. Euler's identity, on the other hand, could give the adversary several encryptions of 1 (and therefore also several encryptions of 0), but in order to apply Euler's identity, the attacker has to know $\varphi(N)$. Therefore, to protect encryptions of 1 in this case, the system must hide the Euler function of N. The typical method of accomplishing this is for the system to select N to be a product of large primes.

Therefore, disclosed is a practical private-key fully homomorphic encryption scheme based on rings that provides for efficient computation on encrypted data. The disclosed encryption protocol is unconditionally (i.e., without any computational assumptions) secure against ciphertext-only attack. In addition, this is based on the premise that an attacker's system or third party system, except for the legitimate encryption key holder, does not have access to the encryption mechanism. If the original data do not have a ring structure (for example, data like credit card numbers, or phone numbers, etc.), the disclosed method provides unconditional security for encryption of nonzero elements, even if the public is able to recognize encryptions of 0. This property allows for a very efficient private search on encrypted database without sacrificing privacy of any of the data. It is noted that if the original data originates from a ring isomorphic to $\mathbb{Z}_N$ for some N, then security of nonzero elements in the presence of known encryptions of 0, is based on protecting the Euler function of N. A typical way of accomplishing this is selecting N to be a product of large primes.

Figure 7:
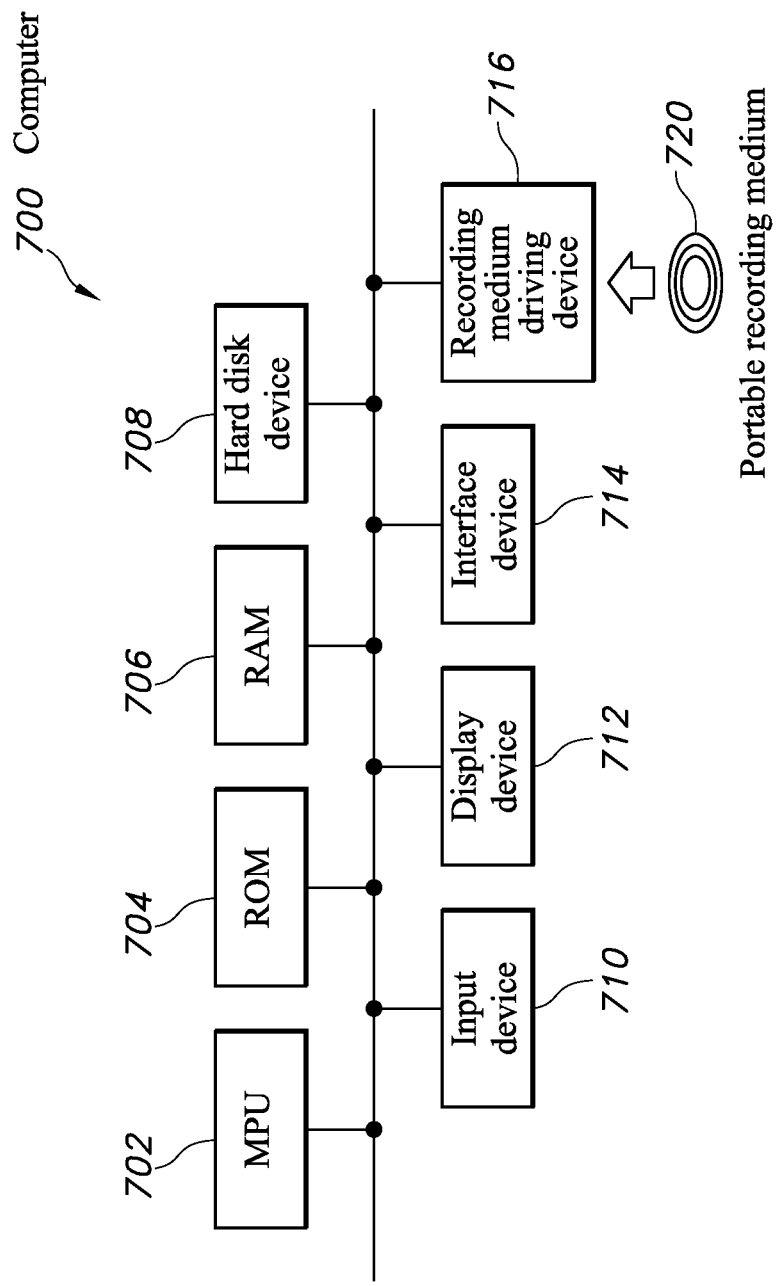
FIG. 7 is an example of a configuration of an encryption processing apparatus using homomorphic encryption.

FIG. 7 illustrates an example of a configuration of the encryption processing apparatus using homomorphic encryption. The homomorphic encryption apparatus may be implemented as a general-purpose computing device 700.

This computer 700 includes an MPU 702, a ROM 704, a RAM 706, a hard disk device 708, an input device 710, a display device 712, an interface device 714, and a recording medium driving device 716. These components are interconnected by a bus line 720, and can mutually transmit and receive various types of data under the control of the MPU 702. The MPU (Micro Central Processing Unit) 702 is an arithmetic processing device for controlling operations of the entire computer 700, and functions as a control processing unit of the computing device 700.

The ROM (Read Only Memory) 704 is a semiconductor memory which is dedicated to read operations, and in which a specified basic control program is prerecorded. The MPU 702 reads and executes the basic control program at startup of the computer 700, so that operations of the components of the computing device 700 can be controlled.

The RAM (Random Access Memory) 706 is a semiconductor memory, which is used as a working storage area if desired when the MPU 702 executes various types of control programs, and to/from which a write/read can be performed on demand.

The hard disk device 708 is a storage device for storing various types of control programs executed by the MPU 702, and various types of data. The MPU 702 reads and executes a specified control program stored on the hard disk device 708, so that various types of control processes to be described later can be executed.

The input device 710 is, for example, a mouse device or a keyboard device. When the input device 710 is operated by a user of the system as for example, illustrated in FIG. 3 or FIG. 4, the input device 710 obtains an input of each type of information, which corresponds to content of the operation, and transmits the obtained input information to the MPU 702. The display device 712 is, for example, a liquid crystal display, and displays various types of texts and images according to display data transmitted from the MPU 702. The interface device 714 manages transmissions and receptions of various types of information among various types of devices connected to the computer 700.

The recording medium driving device 716 is a device for reading various types of control programs and data recorded on a portable recording medium 720. The MPU 701 may execute the various types of control processes to be described later by reading and executing a specified control program recorded on the portable recording medium 720 via the recording medium driving device 716. Examples of the portable recording medium 720 include a flash memory provided with a USB (Universal Serial Bus) connector, a CD-ROM (Compact Disc-Read Only Memory), and a DVD-ROM (Digital Versatile Disc-Read Only Memory).

In order to configure the fully homomorphic encryption processing apparatus by using such a computing device 700, for example, a control program for causing the MPU 702 to execute the processes in the above described processing units is created. The created control program is pre-configured or pre-stored as such on the hard disk device 708 or the portable recording medium 720. Then, a specified instruction is issued to the MPU 702 such that the MPU 702 is caused to read and execute the control program. Therefore, the functions possessed by the encryption processing apparatus are provided by the MPU 702.

Figure 8:
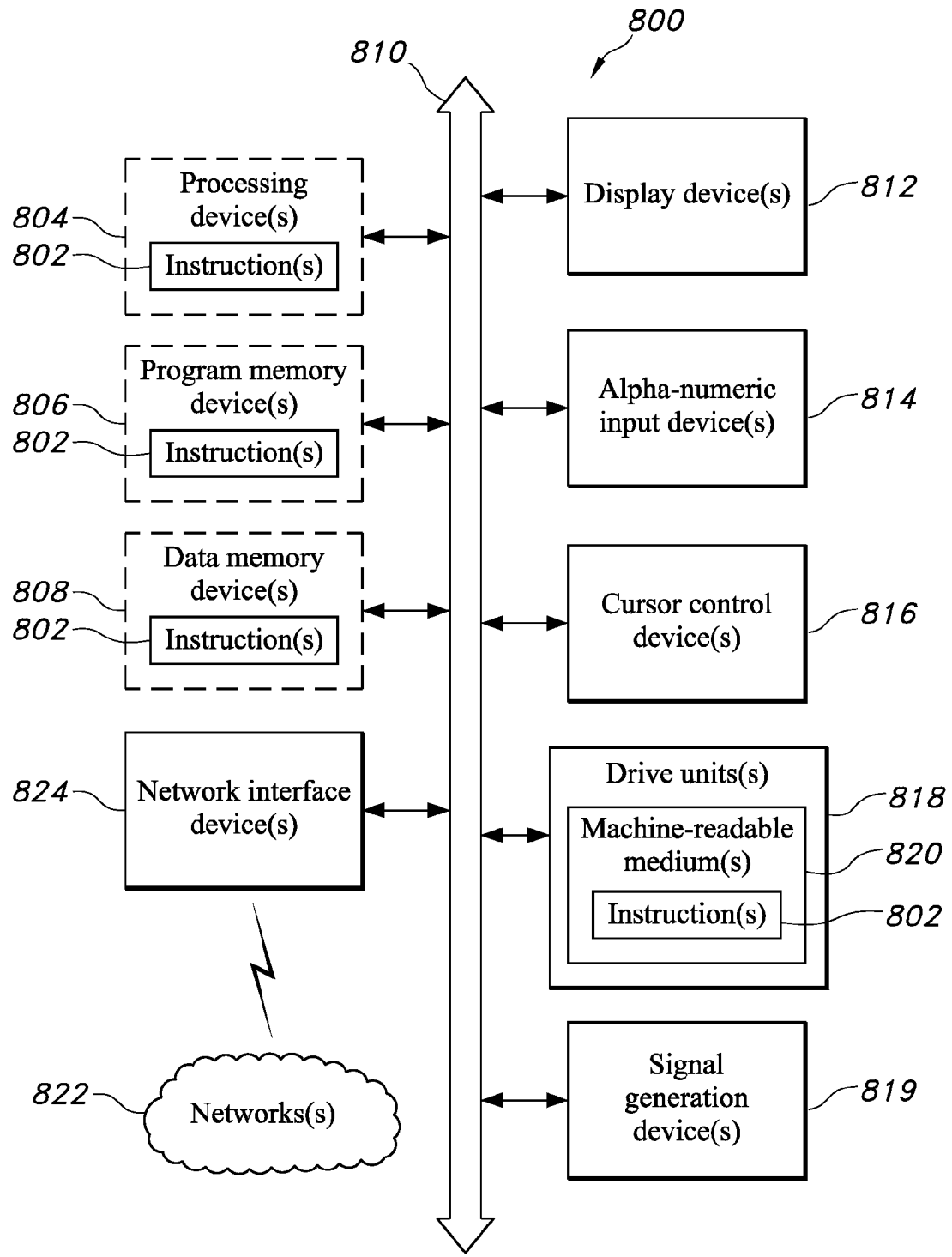
FIG. 8 is a block diagram showing a portion of an exemplary machine in the form of a computing system that performs methods according to one or more embodiments.

FIG. 8 is a block diagram of an embodiment of a machine in the form of a computing system 800, within which a set of instructions 802 is stored, that when executed, causes the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a personal digital assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 800 may include a processing device(s) 804 (such as a central processing unit (CPU), a graphics processing unit (GPU), or both), program memory device(s) 806, and data memory device(s) 808, which communicate with each other via a bus 810. The computing system 800 may further include display device(s) 812 (e.g., liquid crystals display (LCD), a flat panel, a solid state display, or a cathode ray tube (CRT)). The computing system 800 may include input device(s) 814 (e.g., a keyboard), cursor control device(s) 816 (e.g., a mouse), disk drive unit(s) 818, signal generation device(s) 819 (e.g., a speaker or remote control), and network interface device(s) 824.

The disk drive unit(s) 818 may include machine-readable medium(s) 820, on which is stored one or more sets of instructions 802 (e.g., software) embodying any one or more of the methodologies or functions disclosed herein, including those methods illustrated herein. The instructions 802 may also reside, completely or at least partially, within the program memory device(s) 806, the data memory device(s) 808, and/or within the processing device(s) 804 during execution thereof by the computing system 800. The program memory device(s) 806 and the processing device(s) 804 may also constitute machine-readable media. Dedicated hardware implementations, not limited to application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present embodiment contemplates a machine-readable medium or computer-readable medium 820 containing instructions 802, or that which receives and executes instructions 802 from a propagated signal so that a device connected to a network environment 822 can send or receive voice, video or data, and to communicate over the network 822 using the instructions 802. The instructions 802 may further be transmitted or received over a network 822 via the network interface device(s) 824. The machine-readable medium may also contain a data structure for storing data useful in providing a functional relationship between the data and a machine or computer in an illustrative embodiment of the disclosed systems and methods.

While the machine-readable medium 820 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 31 C.F.R. § 1.12(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods, functions or logic described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods, functions or logic described herein.

It should also be noted that software which implements the disclosed methods, functions or logic may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. A method for producing a public ring that is fully homomorphically encrypted using a fully homomorphic encryption device:
   the at least one fully homomorphic encryption device performing operations that include:
   generating a first presentation G of a ring, wherein $G=(x,y \backslash x^2=0, y^2=0, xy+(p+1)yx=1)$, wherein x and y are generators, and p is a first private prime number;
   generating a second presentation H of the ring, wherein $H=(x,y,t \backslash x^2=0, y^2=0, t=m\hat{\ }x \cdot xy+m_2 yx+t=1)$, wherein $m_1$ and $m_2$ are positive integers and $p+1=m_1+m_2$, wherein t is a generator and the first presentation G of the ring and the second presentation H of the ring are isomorphic; and
   determining, a public ring H that is fully homomorphically encrypted, wherein:
   $H=|x,y,t|N*1=1, x^2=1, y^2=0, xyx=x \cdot yxy=y, tx=0, yt=0, t^2=t+m2\hat{\ }2-m2/m_1 tyx|$, wherein N=pq and q is a second private prime number, the public ring H being publically available, the public ring H being secure against a ciphertext-only attack including an encryption of nonzero elements associated with private data, thereby providing improved security against the ciphertext-only attack on the private data.

2. The method as recited in claim 1, further comprising querying the public ring Ĥ for an encrypted data element.

3. A method of implementing a fully homomorphic encryption (FHE) scheme performed on private data using a unique instantiation of the FHE scheme comprising:
   a fully homomorphic processing device, the fully homomorphic processing device executing the fully homomorphic encryption (FHE) scheme of:
   generating a first presentation of a first ring using a first ring of matrices, the first ring comprising ciphertexts and being public;
   selecting a large private prime number p;
   selecting a second large private prime number q;
   determining N=pq, the N being public;
   generating a second presentation of the first ring using the first ring of matrices, the second presentation being private;
   generating a second ring based on the second presentation, the second ring comprising plaintexts, the second ring being private and being fully homomorphically encrypted;
   generating an isomorphism between the first ring and the second ring, the isomorphism related with fully homomorphic encryption of related data, the isomorphism comprising a private decryption key, the private decryption key being related with continuous privacy of related private data based at least on intractability of factoring of the large private prime number p and the second large private prime number q; and
   encrypting the plaintexts of the second ring using random elements of an Ideal related with the first ring, the Ideal being private, the random elements being selected in order to maintain continuous privacy of the private decryption key and related data, the FHE scheme related with the system being secure and inaccessible to a third party, the FHE system being exclusively privy to the Ideal and the unique instantiation of the FHE scheme being used, the FHE system being exclusively capable of decrypting the related data.

4. The method as recited in claim 3, further comprising querying the public ring Ĥ for an encrypted data element.

5. The method as recited in claim 4, further comprising decrypting the encrypted data element.

6. A system for producing a public ring that is fully homomorphically encrypted, the system comprising:
   a fully homomorphic encryption device, comprising a fully homomorphic encryption processor, the fully homomorphic encryption processor performs the operations of:
   generate a first presentation G of a ring, wherein $G=(x,y \backslash x^2=0, y^2=0, xy+(p+1)yx=1)$, where x and y are generators and p is a first private prime number;
   generate a second presentation H of the ring, wherein $H=(x,y,t \backslash x^2=0, y^2=0, t=m\hat{\ }x \cdot xy+m_2 yx+t=1)$, wherein $m_1$ and $m_2$ are positive integers and $p+1=m_1+m_2$, wherein t is a generator and the first presentation G and the second presentation H are isomorphic; and
   produce a public ring H that is fully homomorphically encrypted, wherein $H=|x,y,t|iV*1=1, x^2=1, y^2=0, xyx=x \cdot yxy=y, tx=0, yt=0, t^2=t+m2\hat{\ }2-m2/m_1 tyx]$ and N=pq, wherein q is a second private prime number, the public ring H being publically available, the public ring H being secure against a ciphertext-only attack including encryption of nonzero elements related with private data, thereby providing improved security against the ciphertext-only attack on the private data.

7. The system as recited in claim 6, further comprising the the fully homomorphic encryption processor query the public ring Ĥ for an encrypted data element.

8. The system as recited in claim 6, further comprising the system decrypt, using a decrypter, the encrypted data element.

9. A method for decrypting a public ring that is fully homomorphically encrypted (FHE) comprising:
   a fully homomorphic processing device with a unique instantiation of an FHE scheme, the device performing the following operations:
   transmitting elements $u=u(v_1, \ldots, v_n)$ of a ciphertext u, to the fully homomorphic processing device, the ciphertext u being in terms of the generators of S or U e S
   determining, using a private linear converter, a private linear combination of other v>i in order to determine u', wherein u' is related with a Ring R;
   determining, using a private idempotent unit, k e $Z_N$ wherein k e $Z_N$ is related with identifying a private idempotent of the Ring R;
   identifying, using a private idempotent unit, the private idempotent related with the Ring R based on k e $Z_N$;
   outputting, using a decrypter unit, a data value related with k e Zm, the data value being stored in a database; and
   outputting, using the decrypter unit, a secret key related with the data value, for storage in a secret key database, the secret key preventing access by a third party system to information about the unique instantiation of the FHE scheme and decryption mechanisms related with the public ring, and permitting access by the third party system to fully homomorphically encrypted data.

10. The method as recited in claim 9, further comprising:

$u'=u'(v_1, \ldots, v_{j-1}, v_{j+1}, \ldots, v_n) \epsilon R.$

11. The method as recited in claim 9, further comprising determining $k \epsilon \mathbb{Z}_N$, wherein $u'=k \cdot r$, and $r=\alpha(I)$.

12. A system for decrypting a public ring that is fully homomorphically encrypted (FHE), using a unique instantiation of an FHE scheme, the system comprising:

a fully homomorphic processing device;
a private linear converter;
a private idempotent unit; and
a decryptor unit;
the fully homomorphic processing device performing the operations that include:
  generating elements it=u($v_v$, ... ,$v_n$) of a ciphertext it, to the fully homomorphic processing device, the ciphertext it being in terms of generators of S or U e S;
  determining, using the private linear converter, a private linear combination of other v>i in order to determine it, wherein u' is related with a Ring R;
  determining, using the private idempotent unit, k e $Z_N$ wherein k e $Z_N$ is related with identifying a private idempotent of the Ring R;
  identifying, using the private idempotent unit, the private idempotent related with the Ring R based on k e $Z_N$; and
  outputting, using the decrypter unit, a data value related with k e $Z_N$;
  the data value being stored in a database; and
  outputting, using the decrypter unit, a secret key related with the data value, for storage in a secret key database, the secret key preventing access by a third party system to information about the unique instantiation of the FHE scheme and decryption mechanisms associated with the public ring, and permitting access by the third party system to the fully homomorphically encrypted data.

13. The system as recited in claim 12, further comprising:

$$u'=u'(v_1, \ldots ,v_{j-1},v_{j+1}, \ldots ,v_n) \epsilon R.$$

14. The system as recited in claim 12, further comprising determining k$\epsilon \mathbb{Z}_N$, wherein u'=k·r, and r=α(I).

* * * * *